(12) United States Patent
Whitta et al.

(10) Patent No.: US 12,377,589 B2
(45) Date of Patent: *Aug. 5, 2025

(54) INJECTION MOLDING SYSTEM, METHOD, AND TOTE MANUFACTURED THEREFROM

(71) Applicant: CREATIVE PLASTIC CONCEPTS, LLC, Sycamore, OH (US)

(72) Inventors: Jacob H. Whitta, Bluffton, OH (US); Eric Hummel, Findlay, OH (US)

(73) Assignee: CREATIVE PLASTIC CONCEPTS, LLC, Sycamore, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,853

(22) Filed: Jan. 31, 2024

(65) Prior Publication Data

US 2024/0253282 A1 Aug. 1, 2024

Related U.S. Application Data

(63) Continuation-in-part of application No. 17/085,460, filed on Oct. 30, 2020, now Pat. No. 11,938,666.

(60) Provisional application No. 62/928,019, filed on Oct. 30, 2019.

(51) Int. Cl.
*B29C 45/27* (2006.01)
*B29K 23/00* (2006.01)
*B29L 31/00* (2006.01)

(52) U.S. Cl.
CPC .. *B29C 45/2708* (2013.01); *B29C 2045/2716* (2013.01); *B29K 2023/12* (2013.01); *B29L 2031/712* (2013.01)

(58) Field of Classification Search
None
See application file for complete search history.

(56) References Cited

U.S. PATENT DOCUMENTS 6,261,075 B1 7/2001 Lee et al.
11,938,666 B2 * 3/2024 Whitta ............... B29C 45/7653
2013/0259969 A1 * 10/2013 Schmidt ................. B29C 45/74
425/549

* cited by examiner

*Primary Examiner* — Virak Nguon
(74) *Attorney, Agent, or Firm* — Thompson Coburn LLP

(57) ABSTRACT

A storage container manufactured from an injection molding process which includes a mold and at least one injector. The mold has a top surface, a bottom wall, a plurality of side surfaces, and at least two separable sections. Where the at least two separable sections are in a closed position, a cavity is formed in the mold. The at least one injector is disposed through at least one of the plurality of sidewalls, and further disposed into the cavity. The storage container has a plurality of sidewalls, an upper edge, and a bottom surface. At least one of the plurality of sidewalls of the resulting storage container contains at least one sprue mark.

19 Claims, 19 Drawing Sheets

INJECTION MOLDING SYSTEM, METHOD, AND TOTE MANUFACTURED THEREFROM

CROSS REFERENCE TO RELATED APPLICATIONS

This application claims the benefit of U.S. Non-Provisional patent application Ser. No. 17/085,460, filed on Oct. 30, 2020, which in turn claims the benefit of U.S. Provisional Application Ser. No. 62/928,019, filed on Oct. 30, 2019. The entire disclosures of the above applications are hereby incorporated herein by reference.

FIELD

The present disclosure relates to injection molding systems and, more particularly, to hot runner injection molding systems.

INTRODUCTION

This section provides background information related to the present disclosure which is not necessarily prior art.

Injection molding is a manufacturing process for producing one or more parts by injecting molten material into a mold. Injection molding can be performed with a host of materials mainly including metals (for which the process is called die-casting), glasses, elastomers, confections, and most commonly thermoplastic and thermosetting polymers. Injection molding is well known in the art. For example, U.S. Pat. No. 6,261,075 to Lee describes a hot runner system for coinjection molding. The entire disclosure of this patent is incorporated herein by reference.

Material for a part is fed into a heated barrel, mixed, and injected into a mold cavity, where it cools and hardens to the configuration of the cavity. After a product is designed, usually by an industrial designer or an engineer, molds are made by a mold-maker from metal, usually either steel or aluminum, and precision-machined to form the features of the desired part.

Injection molding is widely used for manufacturing a variety of parts, from the smallest components to entire body panels of cars. Advances in 3D printing technology, such as using photopolymers which do not melt during the injection molding of some lower temperature thermoplastics, can be used for some simple injection molds.

Parts to be injection molded must be very carefully designed to facilitate the molding process; the material used for the part, the desired shape and features of the part, the material of the mold, and the properties of the molding machine must all be considered. The versatility of injection molding is facilitated by this breadth of design considerations and possibilities.

When plastic totes are manufactured via conventional injection molding, the mold includes injection gates on the bottom portion of the tote in the mold. These bottom gates supply plastic melt to the entire mold. These systems require relatively large amounts of clamp tonnage and injection pressure to ensure the mold is completely filled. The resulting plastic tote has relatively high stress points on the bottom walls, which leads to a less durable final product. Also, to reduce injection pressure and required clamp tonnage to prevent flashing, melt temperatures often need to be elevated above recommended manufacturing ranges to reduce viscosity and improve flowability. Unfortunately, this degrades the thermoplastic physical properties, which has negative effects on part quality and strength.

Accordingly, there is a continuing need for an injection molding system that requires less clamp tonnage and injection pressure. Desirably, the injection molding system would allow for a lower melt temperature and improved part quality and strength.

SUMMARY

In concordance with the instant disclosure, an injection molding system that requires less clamp tonnage, less injection pressure and, which allows for a lower melt temperature and improved part quality and strength, has surprisingly been discovered.

In certain embodiments, a storage container is provided that has a body formed by an injection molding process. The body has a plurality of sidewalls, an upper edge, and a bottom surface. The injection molding process includes injecting a molten material into at least one of the plurality of sidewalls of the storage container.

In certain embodiments, the body formed by the injection molding process further includes at least one sprue mark on at least one of the plurality of sidewalls. The at least one sprue mark is a physical indication of where the molten material was injected at on the storage container during the injection molding process. As a non-limiting example, the sprue mark may be a circle with a nub located in a substantially central location on the circle.

In certain embodiments, a method for manufacturing a storage container is provided. The method may have a step of providing a mold having a top wall, a bottom wall, a plurality of sidewalls, and at least two separable sections. The at least two separable sections may be selectively disposed in at least one of an open position and a closed position. The first section may be configured to selectively receive the second section, in operation. Where the mold is in the closed position, a cavity may be formed between the two sections. The mold may further include at least one injector disposed through at least one of the plurality of sidewalls and directed at the cavity when the mold is in the closed position. The method may include another step of providing a molten material. Next, the method may have a step of injecting the molten material through the at least one injector disposed through the at least one of the plurality of sidewalls of the mold. Afterwards, the method may include a step of removing the manufactured storage container from the mold.

In certain embodiments, the present technology is drawn to a side shot injection molding system for forming a storage container. The side shot injection molding system includes a mold and at least one injector. The at least one injector may be disposed through at least one of the plurality of sidewalls of the mold and further disposed into the cavity. The side shot injection molding system of the present disclosure may be a hot runner system. It should be appreciated that the mold may be configured to receive thermoplastic melt material, in operation. The mold may be configured to create a plastic tote having a base wall and a plurality sidewalls, as a non-limiting example. The mold may have a plurality of openings configured to receive the at least one injector, as described hereinbelow. It should be appreciated that the openings may be formed in plurality of sidewalls of the mold. The top wall and bottom wall may not contain any of the openings. Advantageously, the placement of the openings on the sidewalls allows the side shot injection molding system to require less clamp tonnage and injection pressure, which allows for a lower melt temperature and improved part quality and strength.

In certain embodiments, a mold is provided that may have four sidewalls with a substantially rectangular cross section and six openings formed therethrough. The four sidewalls may include a first pair of parallel sidewalls and a second pair of parallel sidewalls. Each one of the first pair of sidewalls may have one opening formed therein. Each of the openings of the first pair of sidewalls may be formed substantially parallel from the corresponding opening. Each one of the second pair of sidewalls may have two openings formed therein. Each of the openings of the first pair of sidewalls may be formed substantially parallel to the corresponding opening on an opposite side wall. In other words, each opening may have a corresponding opening formed in an opposite sidewall.

Accordingly, a side shot injection molding process, as provided herein, may have six injectors with each one of the six injectors disposed in each one of the six openings. In operation, the injectors may each inject the thermoplastic melt material on a plane. The plane may be substantially the same plane that the injector disposed parallel in the opposite sidewall injects plastic melt material into the mold.

The present disclosure further provides a method of manufacturing a plastic via the side shot injection molding process. A first step of the method may include providing a side shot injection molding system, as described herein. A second step of the method may also include providing a thermoplastic melt material. Next, the method may include a third step of injecting the thermoplastic melt material through the at least one injector into the mold. The thermoplastic melt material may be injected to form a plurality of sidewalls of the tote. A base wall may be formed when an injection force pushes the thermoplastic melt material through the mold. The method may also include a fourth step of opening the mold. The second section of the mold may be removed after the thermoplastic melt material has cooled. Thus, the plastic tote is formed.

It should be appreciated that the resulting plastic tote has reduced stress compared to a tote manufactured through conventional injection molding, where the molten material is injected at a bottom surface of the storage tote. The reduction of stress in the resulting tote from the side shot injection molding process allows for a more durable product. Further, the injection molding system requires less clamp tonnage compared to conventional injection molding systems, which provides a more efficient and less wasteful system.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
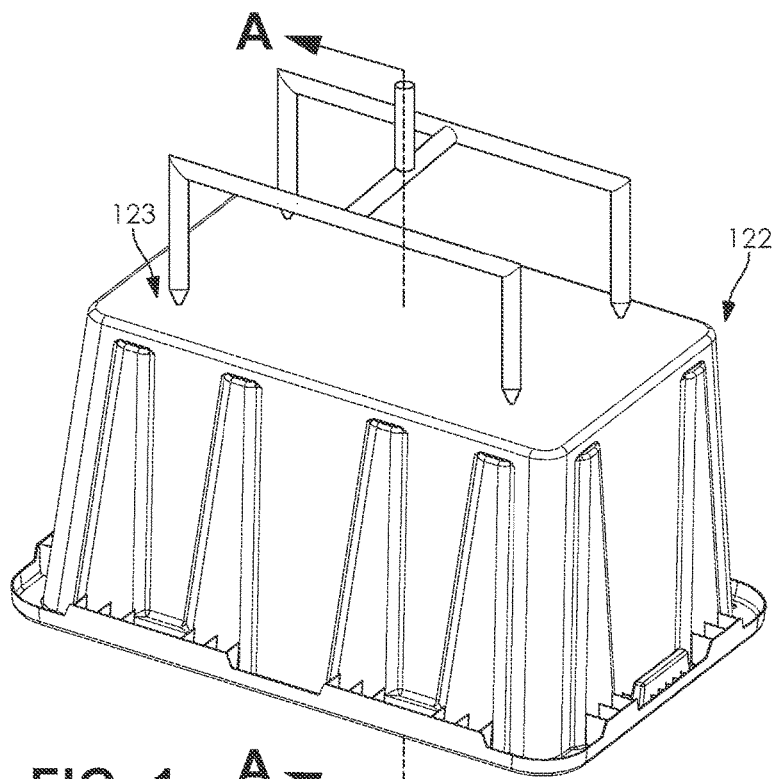
FIG. 1 is a bottom perspective view of a prior art storage tote.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIGS. 2-3, 5, 7, and 13, a storage container 100 has a body 102 which is formed by a side shot injection molding process 104. The body 102 has a plurality of sidewalls 106, 108, 110, 112, an upper edge 114, and a bottom surface 116. The side shot injection molding process 104 may include injecting a molten material 118 into at least one of the plurality of sidewalls 106, 108, 110, 112 of the storage container 100. Advantageously, by injecting the molten material 118 into at least one of the plurality of sidewalls 106, 108, 110, 112, the molten material 118 may be required to travel a lesser distance to fill a mold 120 where compared to a similar storage tote 122 formed by an injection molding process that includes injecting the molten material 118 at a base wall 123 of the storage tote 122, as shown in the prior art of FIGS. 1 and 6.

In one example, the molten material 118 may be injected into the at least one of the plurality of the sidewalls 106, 108, 110, 112 of the storage container 100 at a desired height and a desired lateral position so that the bottom surface 116 and upper edge 114 of the storage container 100 are substantially simultaneously injected with molten material 118.

In a specific non-limiting example, the molten material 118 used in the side shot injection molding process 104 includes a thermoplastic melt material. In a more specific non-limiting example, the thermoplastic melt material may include propylene.

As shown in FIGS. 2-3, 8, and 13, the plurality of sidewalls 106, 108, 110, 112 may include a first sidewall 106, a second sidewall 108, a third sidewall 110, a fourth sidewall 112, and a plurality of corners 124 therebetween. In a more particular instance, the first sidewall 106 and the second sidewall 108 may each have a first length FL, the third sidewall 110 and the fourth sidewall 112 may each have a second length SL, and the first length FL may be longer than the second length SL. In an even more particular instance, the first sidewall 106 may be disposed on an opposite side of the storage container 100 from the second sidewall 108.

Figure 3:
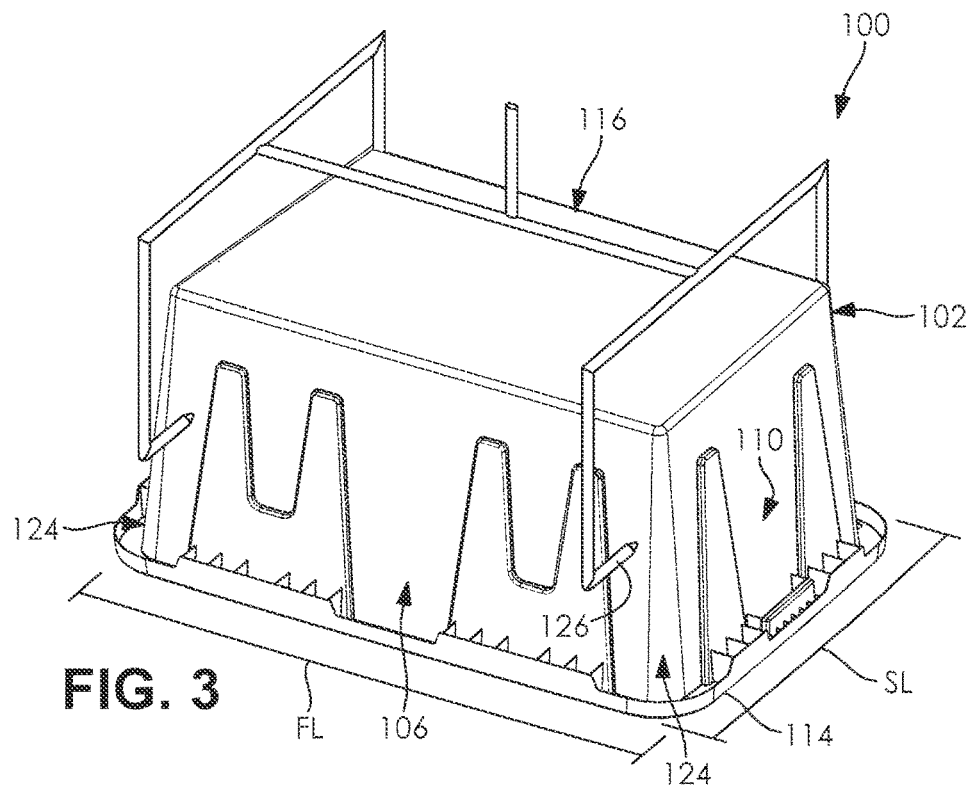
FIG. 3 is a bottom perspective view of the storage tote formed by the side-shot injection molding process, according to another embodiment of the present technology.
Figure 4:
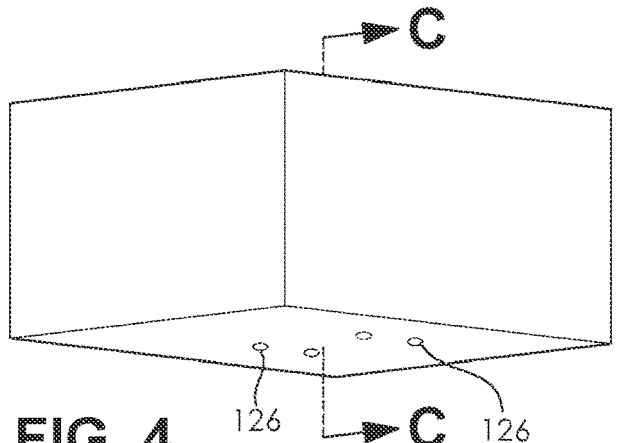
FIG. 4 is a bottom perspective view of a prior art mold apparatus.

In a specific example, as shown in FIG. 3, the side shot injection molding process 104 may include injecting the molten material 118 at only the first sidewall 106 and the second sidewall 108. In a more specific example, the side shot injection molding process 104 may include injecting the molten material 118 at each of the first sidewall 106 and the second sidewall 108 at a desired location near each of the plurality of corners 124 of the storage container 100 to achieve a balanced fill in each of the plurality of sidewalls 106, 108, 110, 112. The balanced fill may be achieved where the bottom surface 116 and the upper edge 114 of the storage container 100 may be completely injected with molten material 118 substantially simultaneously. In an even more specific example, the side shot injection molding process 104 may include injecting the molten material 118 with two injectors 126 on each of the first sidewall 106 and the second sidewall 108.

Figure 2:
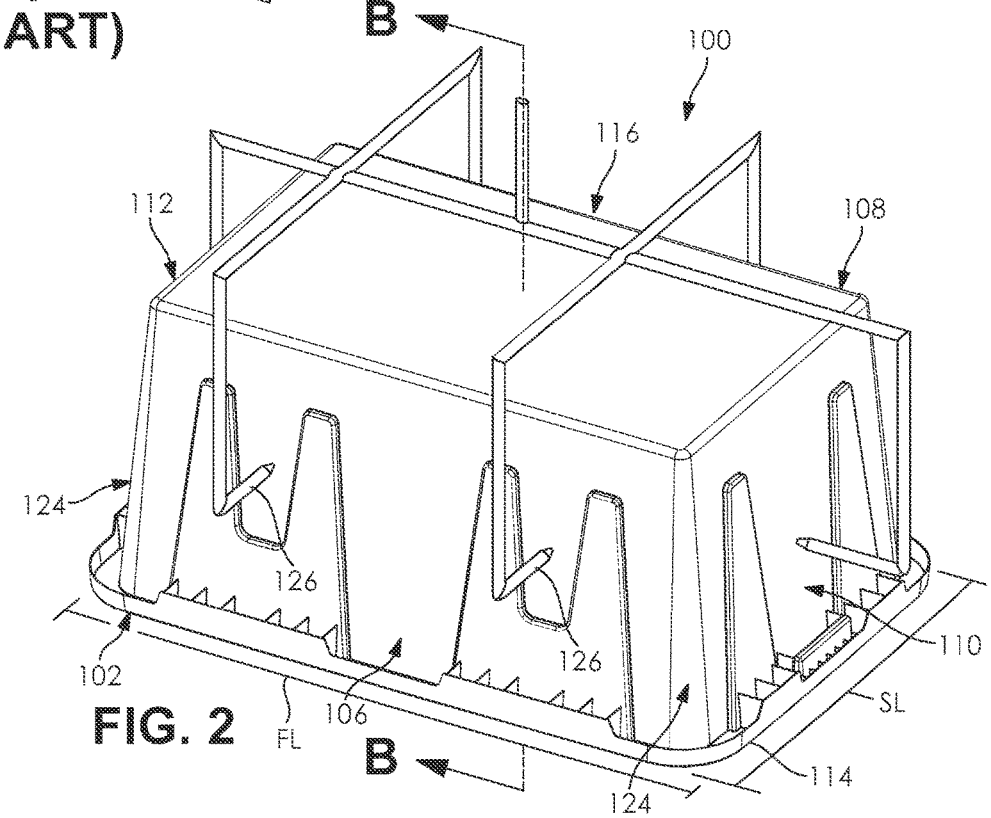
FIG. 2 is a bottom perspective view of a storage tote formed by a side-shot injection molding process, according to one embodiment of the present technology.
Figure 5:
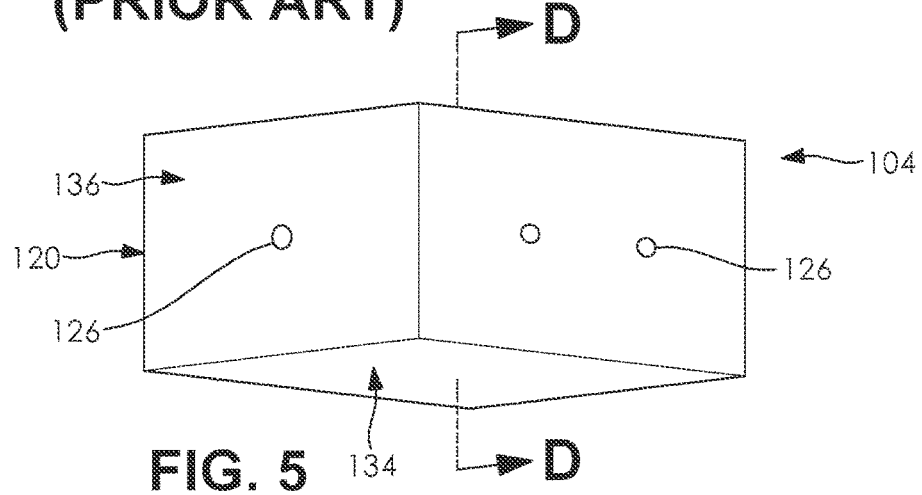
FIG. 5 is a bottom perspective view of a mold apparatus utilized in manufacturing the storage tote formed by the side-shot injection molding process, shown in FIGS. 2-3.
Figure 6:
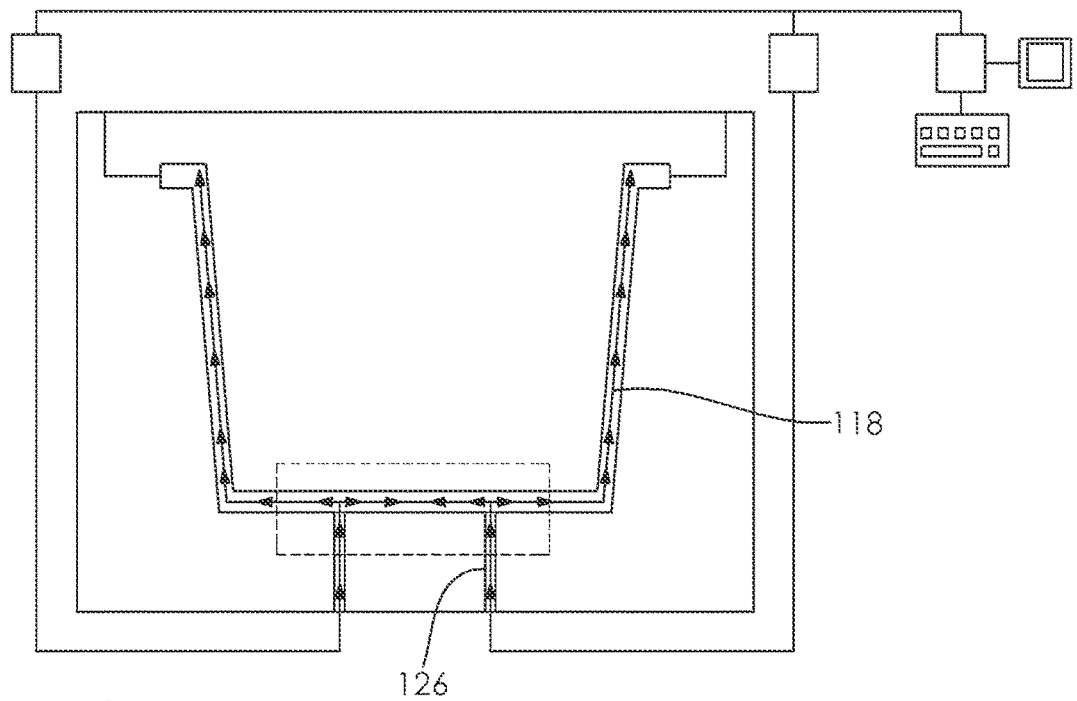
FIG. 6 is a cross-sectional, side elevational view of the prior art mold apparatus taken at section line C-C in FIG. 4.
Figure 7:
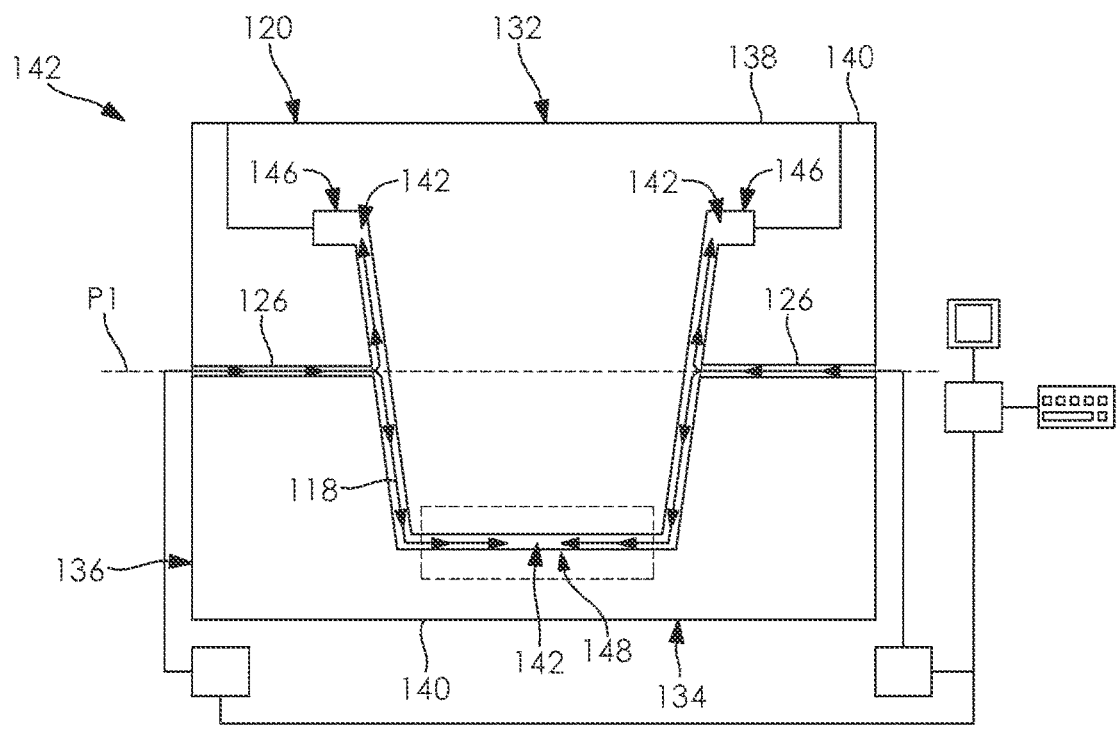
FIG. 7 is a cross-sectional, side elevational view of the mold apparatus taken at section line D-D in FIG. 5.
Figure 13:
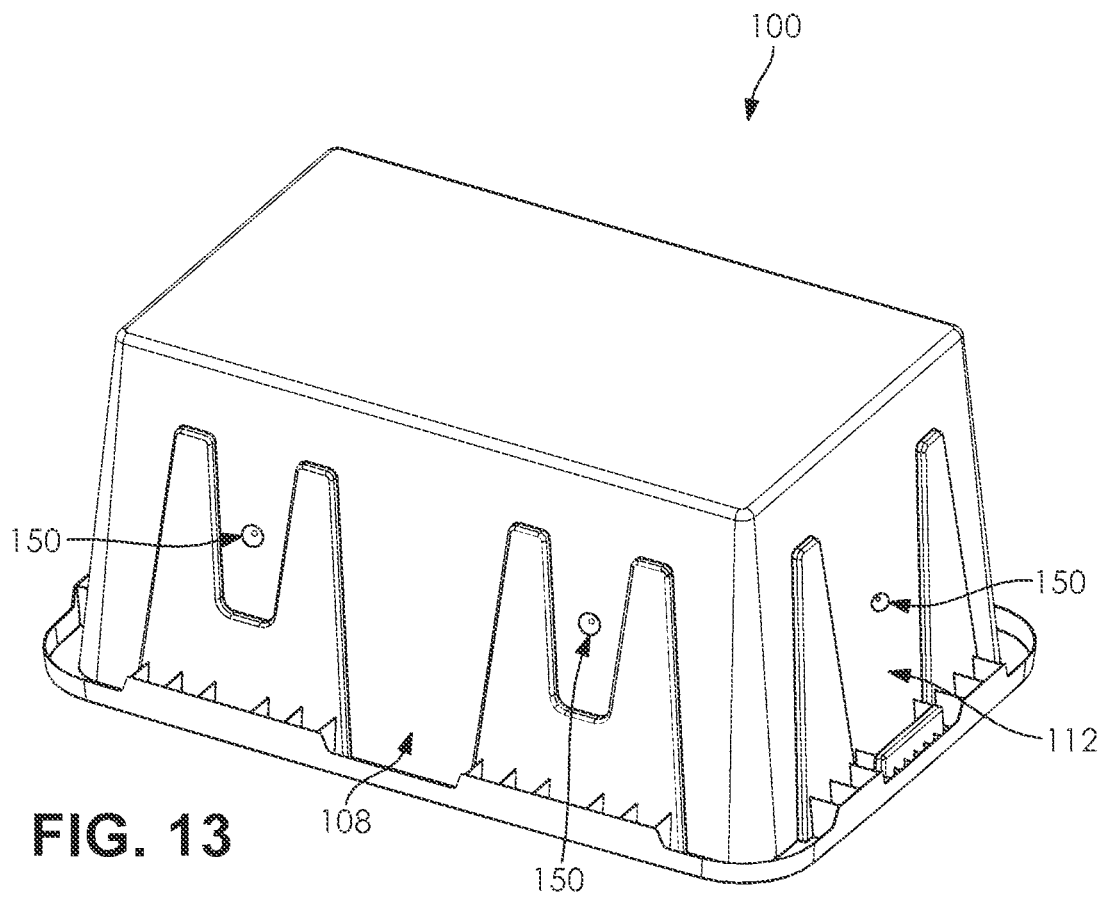
FIG. 13 is bottom perspective view of the storage tote formed by the side-shot injection molding process, as shown in FIG. 2, depicting a plurality of sprue marks on the plurality of sidewalls of the storage tote, according to one embodiment of the present technology.

In a particular example, as shown in FIGS. 2, 5, and 13, the body 102 may be formed by a side shot injection molding process 104 that includes injecting a molten material 118 into each of the plurality of sidewalls 106, 108, 110, 112 of the storage container 100. In a more particular example, the side shot injection molding process 104 may include injecting the molten material 118 at each of the plurality of sidewalls 106, 108, 110, 112 of the storage container 100 using a plurality of injectors 126 on each of the first sidewall 106 and the second sidewall 108 and at least one injector 126 on each of the third sidewall 110 and the fourth sidewall 112. In an even more particular example, as shown in FIGS. 2-3, the side shot injection molding process 104 may include injecting the molten material 118 at each of the plurality of sidewalls 106, 108, 110, 112 of the storage container 100 on a first plane P1.

In one instance, the storage container 100 may have a weight that is about 15% less than a weight of the storage tote 122 formed by an injection molding process which includes injecting the molten material 118 at the base wall 123 of the storage tote 122.

Figure 11:
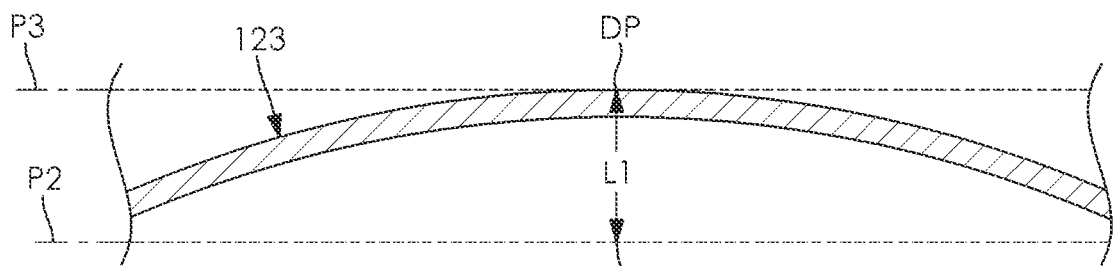
FIG. 11 is an enlarged, fragmentary, side elevational view of the prior art storage tote taken at call-out 10 in FIG. 9, depicting a tolerance of deflection of a base wall in the prior art storage tote as manufactured.
Figure 12:
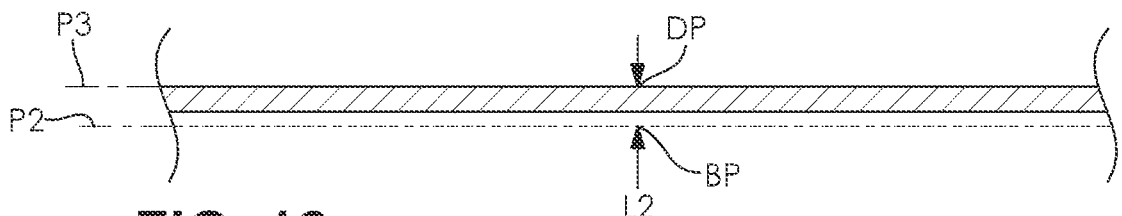
FIG. 12 is an enlarged, fragmentary, side elevational view of the storage tote taken at call-out 11 in FIG. 10, depicting a tolerance of deflection of a base wall of the storage tote as manufactured, the tolerance of deflection being superior to the tolerance of deflection shown in FIG. 10.

As shown in the prior art of FIGS. 1, and 11-12, the storage tote 122 formed by the injection molding process which includes injecting the molten material 118 at the bottom surface of the storage tote 122 will have a "tolerance of deflection" associated with the pressure and stress induced on the plastic materials during the injection molding manufacturing process. The tolerance of deflection, which is identified in FIG. 11 by "L1," may be defined as a distance between a baseline point BP on a second plane P2 and a deflection point DP on a third plane P3, and is a useful metric for the warping of the storage tote post-manufacturing. Each of the deflection point DP and the baseline point BP may be substantially centrally located adjacent a central area 128 of a base wall 123. In some instances, the deflection point DP is at an apex of the base wall 123 relative to the second plane P2. It should be appreciated that the baseline point BP is found at a hypothetical nominal location where there is no deflection of the base wall as manufactured. Additionally, the deflection point DP is found at a furthest location from the nominal location that is associated with deflection of the base wall 123 following the manufacturing of the storage tote 122. The baseline point BP and the deflection point DP may therefore be used to determine the tolerance of deflection L1.

Figure 9:
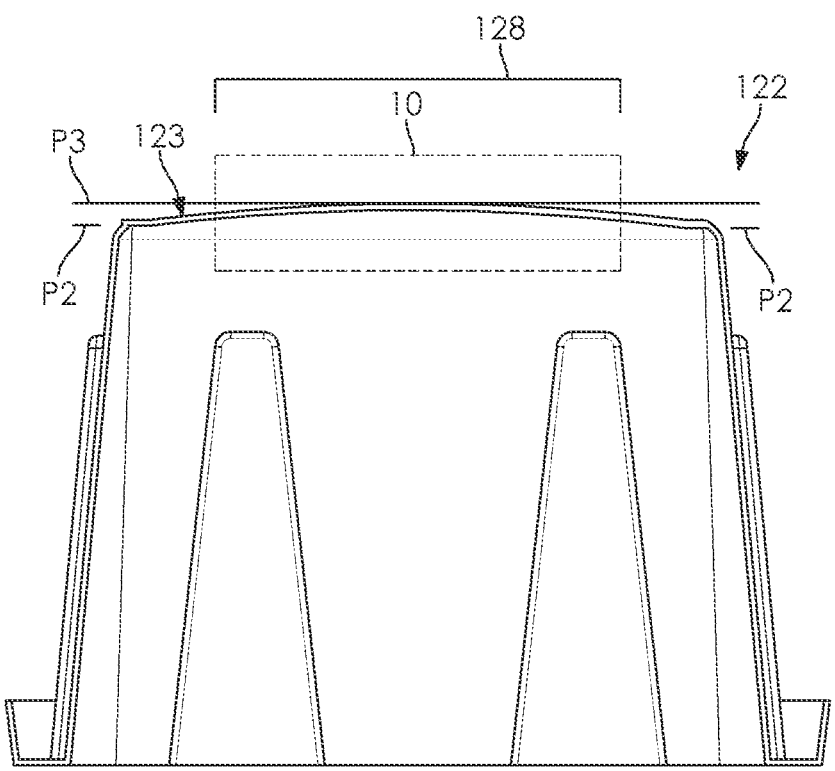
FIG. 9 is a cross-sectional, side elevational view of the prior art storage tote taken at section line A-A in FIG. 1.

With continued reference to the prior art storage tote 122 formed by the injection molding process which includes injecting the molten material 118 at the base wall 123 of the storage tote 122, as shown in FIGS. 1, 9 and 11, the tolerance of deflection L1 may be acquired by measuring a distance between the baseline point BP and the deflection point DP. It is known that the tolerance of deflection associated with the aforementioned prior art storage totes 122 are typically greater than about 0.15 inches.

Figure 10:
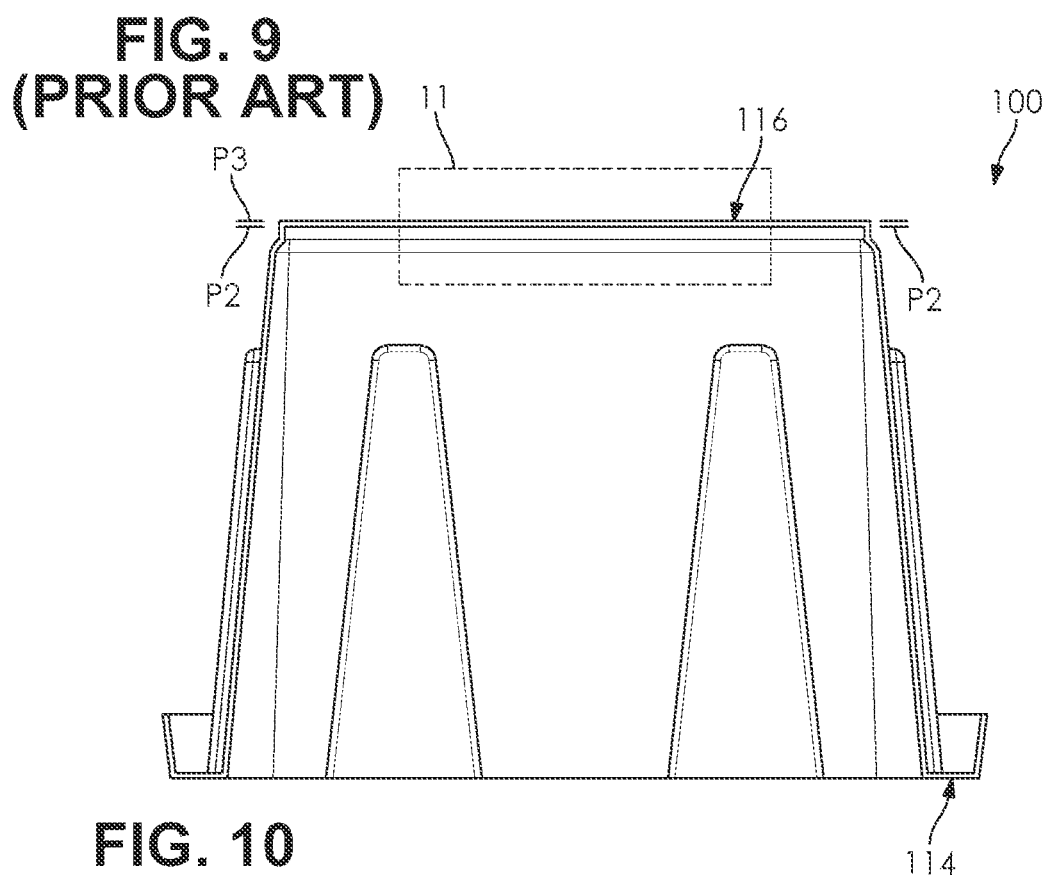
FIG. 10 is a cross-sectional, side elevational view of the storage tote formed by the side-shot injection molding process taken at section line B-B in FIG. 2.

Advantageously, and as shown in FIGS. 10 and 12, the bottom surface 116 of the storage container 100 of the present disclosure has a tolerance of deflection L2 that is significantly less than the tolerance of deflection L1 associated with the prior art storage tote 122 formed by the injection molding process which includes injecting the molten material 118 at the base wall 123 of the storage tote 122. In particular examples, it has been found that the tolerance of deflection L2 for storage containers 100 formed by the side shot injection molding process 104 is between thirty-three percent (33%) and fifty percent (50%) less than the tolerance of deflection L1 for prior art storage totes 122 of similar overall size and dimensions. This important reduction in the tolerance of deflection of the bottom surface 116 of the storage container 100 of the present disclosure is realized in minimal warping and improved durability of the storage container 100.

In particular, and with continued reference to FIG. 12, the tolerance of deflection L2 for the bottom surface 116 of the storage container 100 is less than 0.15 inches. In a more specific example, the tolerance of deflection L2 is between 0.07 inches and 0.11 inches. In an even more specific example, the tolerance of deflection L2 may be between 0.09 inches and 0.1 inches. In a most specific example, the tolerance of deflection L2 may be about 0.094 inches. It has been found that the tolerance of deflection L2 in these ranges results in a significant improvement in reducing warping and enhanced durability of the storage container 100, in operation, relative to the prior art storage totes 122 as described and shown in FIGS. 1, and 9-10. Other suitable deflection tolerances may also be accepted by the skilled artisan, for example, based on the overall size and dimensions of the storage container 100 being manufactured, within the scope of the present disclosure.

In a certain example, the storage container 100 formed by the side shot injection molding process 104 may be more durable compared to a similar storage tote 122 formed by known injection molding processes. In a more specific example, the durability of the storage container 100 may be tested in a variety of manners such as a drop test and an impact resistance test. The drop test only awards a pass rating when the storage container 100 incurs no damage after dropping the storage container 100 three times from a height of thirty-six inches to a vinyl covered concrete slab (not shown). The impact resistance test only awards a pass rating where the storage container 100 incurs no cracking, chipping, or separation of material where the storage container 100 may be placed lying on the first sidewall 106 and a three ounce (+/−2%) steel ball may be dropped onto the second sidewall 108 of the storage container 100 from a height of 36 inches. Storage totes, such as storage tote 122, formed by known injection molding processes typically do not pass at least one of the drop test and the impact resistance test. Advantageously, the storage container 100 formed by the side shot injection molding process 104 passes each of the drop test and the impact resistance test. A skilled artisan may select other durability tests to identify the superior strength of the storage container 100 formed by the side shot injection molding process 104, within the scope of the present disclosure.

Figure 14:
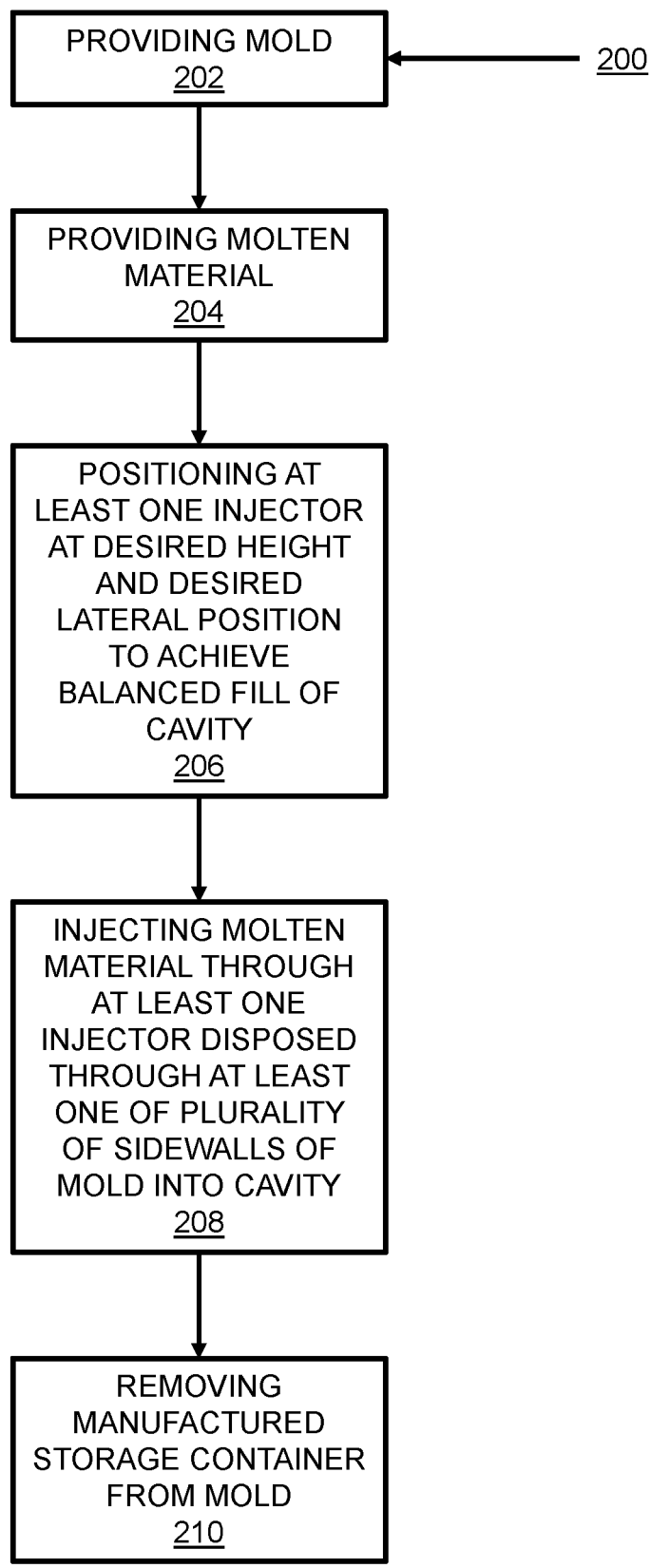
FIG. 14 is a flowchart of a method for manufacturing the storage tote formed by the side-shot injection molding process, according to one embodiment of the present technology.

In a particular embodiment, as shown in FIG. 14, the storage container 100 formed by the side shot injection molding process 104 may include a method 200 for manufacturing the storage container 100. The method 200 may have a step 202 of providing a mold 120 having a top wall 132, a bottom wall 134, a plurality of side surfaces 136, and at least two separable sections 138, 140. The at least two separable sections 138, 140 may be selectively disposed in at least one of an open position (not shown) and a closed position 142. The first section 138 may be configured to selectively receive the second section 140, in operation. Where the mold 120 is in the closed position 142, a cavity 144 may be formed between the first section 138 and the second section 140. The mold 120 may further include at least one injector 126 disposed through at least one of the plurality of side surfaces 136 and directed at the cavity 144 where the mold 120 is in the closed position 142. The method 200 may include another step 204 of providing a molten material 118. Next, the method 200 may have a step 206 of positioning the at least one injector 126 at a desired height and a desired lateral position to achieve a balanced fill of the cavity 144. The balanced fill of the cavity may be achieved where a top end 146 of the cavity 144 and a bottom end 148 of the cavity 144 may be completely injected with molten material 118 substantially simultaneously. The method 200 may include an additional step 208 of injecting the molten material 118 through the at least one injector 126 disposed through the at least one of the plurality of side surfaces 136 of the mold 120 into the cavity 144. Afterwards, the method 200 may include a step 210 of removing the manufactured storage container 100 from the mold 120.

In one example, the side shot injection molding process 104 may have faster total production time than known methods. The total production time is the time required to form the storage container 100. In a more specific example, the total production time of the side shot injection molding process 104 is about 55% less than a total production time of the storage tote 122 formed by the injection molding process which includes injecting the molten material 118 at the base wall 123 of the storage tote 122.

Figure 8:
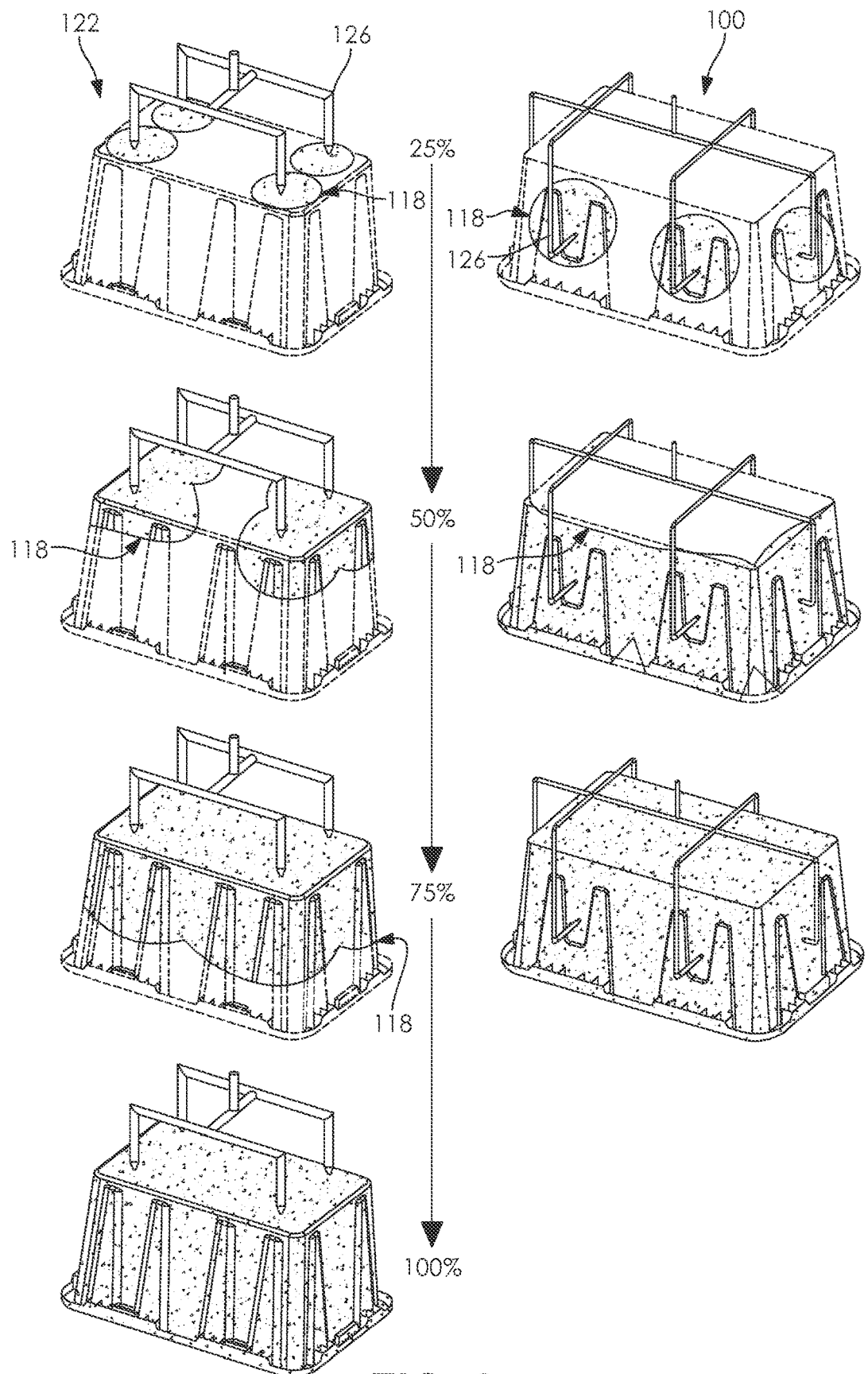
FIG. 8 is a series of top perspective views of each of a storage tote formed by conventional methods, as shown in FIG. 1, and the storage container formed by the side-shot injection molding process, as shown in FIG. 2, further depicting the storage container formed by the side-shot injection molding process filling at a faster rate than the storage tote formed by conventional methods.

In another example, as shown in FIG. 8, the storage container 100 formed by the side shot injection molding process 104 has a faster fill time than known methods. Fill time is the time required to fill the cavity 144 to form the storage container 100. In a more specific example, the fill time of the side shot injection molding process 104 is between eleven percent (11%) and forty-five percent (45%) faster than the fill time of a similar storage tote 122 formed by the injection molding process which includes injecting the molten material 118 at the bottom surface of the storage tote 122. With continued reference to FIG. 8, as a non-limiting example, it should be acknowledged that the storage container 100 is completely formed by the time indicator "75%," whereas the storage tote 122 formed by injecting the molten material 118 at the bottom surface of the storage tote 122 is not completely formed until the time indicator "100%." Advantageously, the faster fill time of the storage container 100 formed by the side shot injection molding process 104 may allow for a lower temperature molten material 118 to be required to form the storage container 100. Desirably, the lower temperature molten material 118 may completely form the storage container 100 without prematurely solidifying in the cavity 144 due to the faster fill time of the side shot injection molding process 104. In a certain embodiment, the injection molding process 104 has a fill time which is the time required to fill the cavity 144 to form the storage container 100, wherein the fill time is between 2.5 seconds and 4.0 seconds.

In a separate example, the side shot injection molding process 104 may include injecting the molten material 118 at a temperature between 350° F. and 550° F. The temperature of the molten material 118 in the prior art storage tote 122 formed by the injection molding process, which includes injecting the molten material 118 at the base wall 123 of the storage tote 122, typically requires a temperature above 550° F. Advantageously, the side shot injection molding process 104 may require a lower temperature of the molten material 118 which may reduce a molten material 118 heating time, a molten material 118 cooling time, and any energy required for additional heating of the molten material 118. A skilled artisan may select other suitable temperature ranges to form the storage container 100, within the scope of the present disclosure.

In a particular instance, the side shot injection molding process 104 may require a lower clamp force pressure than known methods. The clamp force pressure is the pressure required to hold the mold 120 in the closed position 142 to form the storage container 100 during the side shot injection molding process 104. In a more particular instance, the clamp force pressure is about 25% less than a clamp force required to form the prior art storage tote 122 by the injection molding process which includes injecting the molten material 118 at the base wall 123 of the storage tote 122.

In a separate embodiment, the body 102 formed by the side shot injection molding process 104 may further include at least one sprue mark 150 on at least one of the plurality of sidewalls 106, 108, 110, 112. The at least one sprue mark 150 is a physical indication of where the molten material 118 was injected at on the storage container 100 during the side shot injection molding process 104. As a non-limiting example, the sprue mark 150 may be a circle with a nub located in a substantially central location on the circle.

Advantageously, the method of manufacturing a storage container 100 with the side shot injection molding process 104 of the present disclosure requires less clamp tonnage, lower melt temperature, and injection pressure. Further, the resulting storage container 100 may have a lighter weight and have improved part quality, deflection, and strength where compared to a conventional storage tote 122, where the molten material 118 is injected at the base wall 123 of the storage tote 122.

Figure 15:
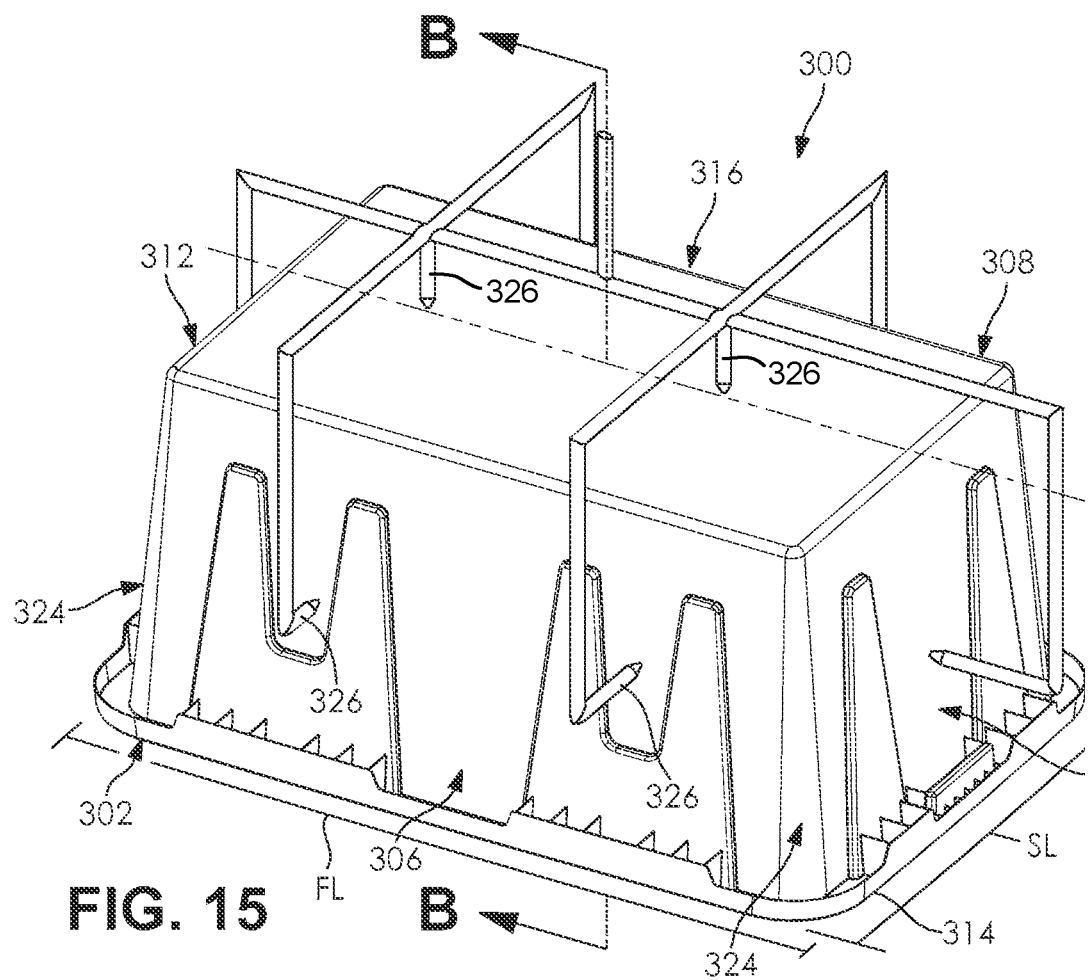
FIG. 15 is a bottom perspective view of a storage tote formed by an injection molding process, according to another embodiment of the present technology.

With reference to FIGS. 15-24, a storage container 300 is provided, according to another embodiment of the present disclosure. The storage container 300 is shown having the same features of the storage container 100. The storage container 300 may further be manufactured by injecting molten material 318 through at least one injector 326 disposed through the bottom wall 334 of the mold 320. More particularly, the storage container 300 may be manufactured by injecting molten material 318 through at least one bottom injector 326 disposed through the bottom wall 334 and through at least one side injector 326 disposed through at least one of the plurality of sidewalls 306, 308, 310, 312. The at least one side injector 326 may further include a first pair of side injectors 326 disposed through the first sidewall 306 and a second pair of side injectors 326 disposed through the second sidewall 308. In another embodiment, at least one side injector 326 may additionally be disposed through each of the third sidewall 310 and the fourth sidewall 312, as shown in FIG. 15.

In a particular embodiment, as shown in FIGS. 15-19, the storage container 300 may be formed using two bottom injectors 326 disposed through the bottom wall 334 in addition to using a plurality of side injectors 326 disposed through the plurality of sidewalls 306, 308, 310, 312. It should be appreciated that the bottom injectors 326, as described herein, are the same feature as the plurality of injectors 326 and that the storage container 300, when compared to the storage container 100, is manufactured using injectors 326 disposed through each of the bottom wall 334 and at least one of the plurality of sidewalls 306, 308, 310, 312. However, the storage container 300 should be understood to include the same features as the storage container 100. It should also be appreciated that the molten material 318, as further described herein, is the same as the molten material 118.

Figure 16:
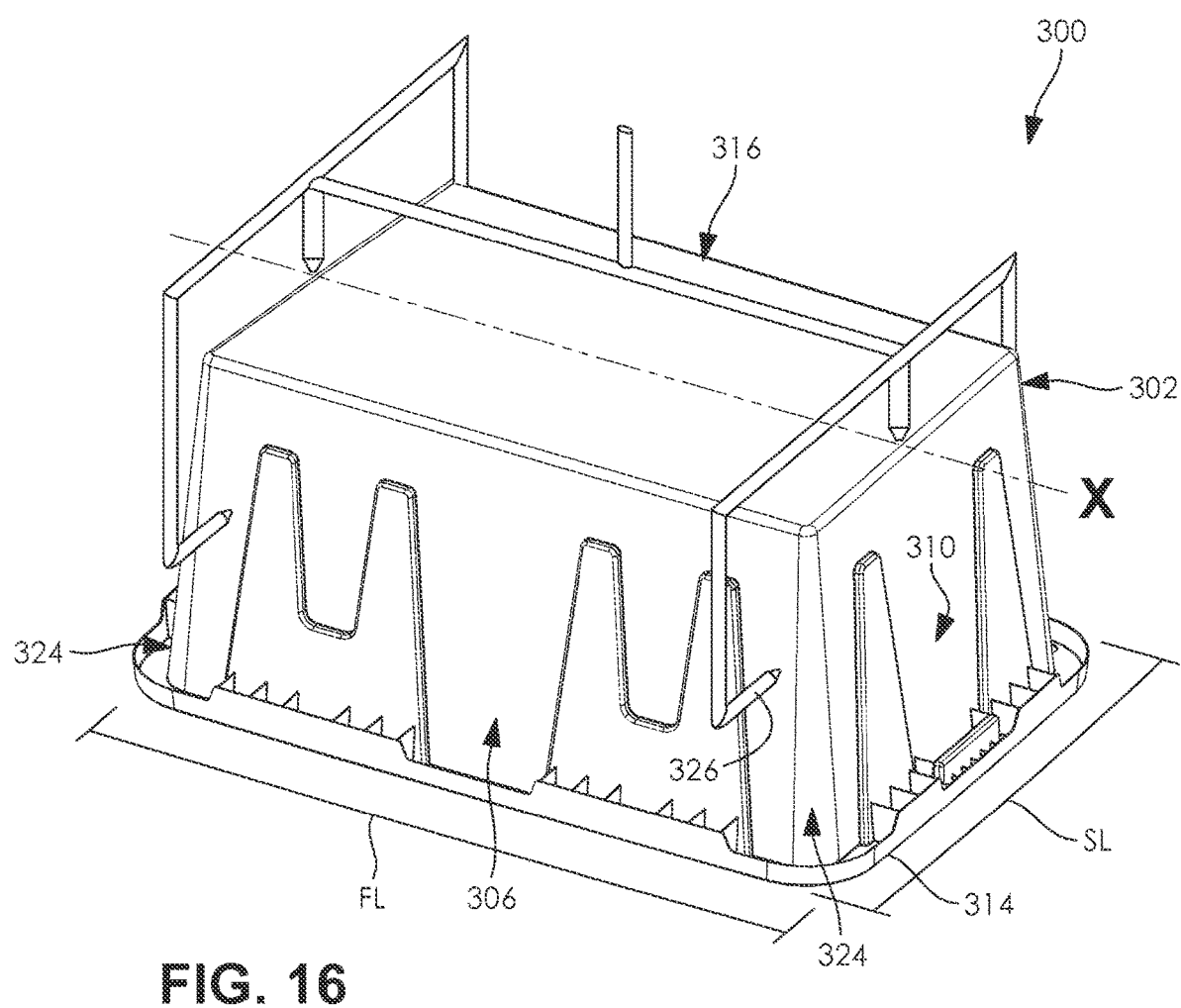
FIG. 16 is a bottom perspective view of the storage tote formed by an injection molding process, according to yet another embodiment of the present technology.
Figure 17:
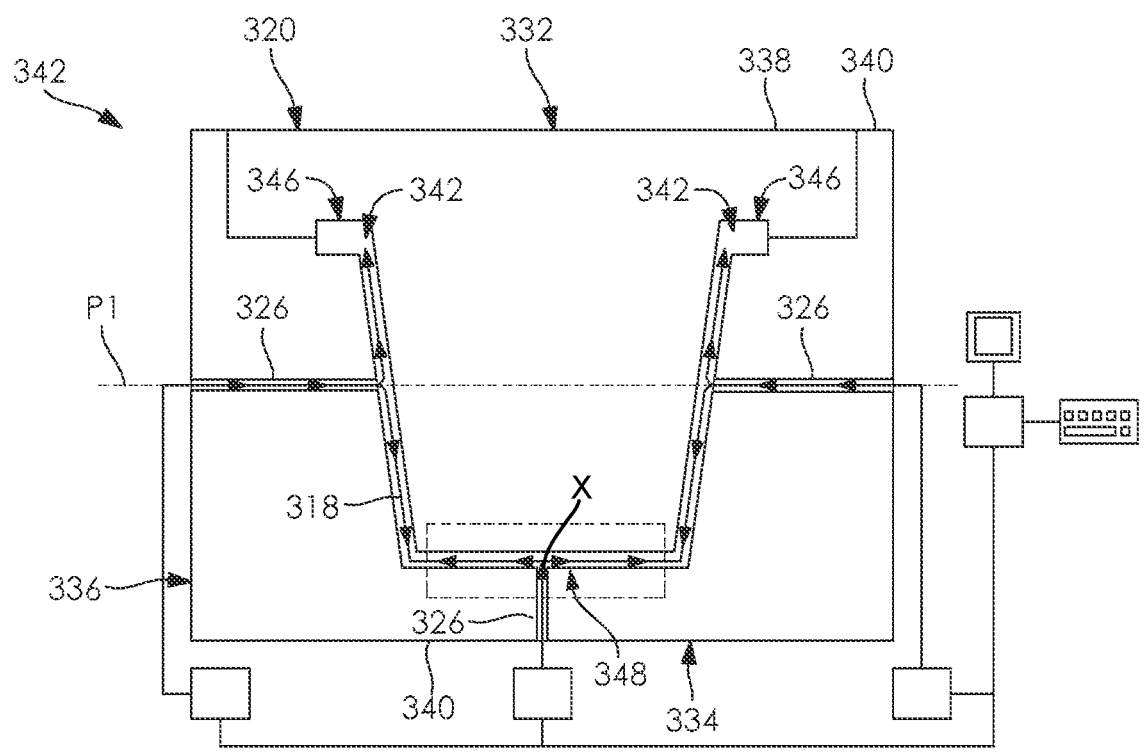
FIG. 17 is a cross-sectional, side elevational view of the mold apparatus taken at section line D-D in FIG. 5, in yet another embodiment of the present technology.

With renewed reference to FIGS. 15-19, the two bottom injectors 326 may be disposed along a central axis (X) extending across the entirety of a length of the bottom wall 334. The central axis (X) may bisect the bottom wall 334, as shown in FIGS. 15 and 16. The two bottom injectors 326 may include a first bottom injector and a second bottom injector. The first bottom injector may be disposed adjacent the second bottom injector, and each of the bottom injectors 326 may be equally spaced apart from the third sidewall 310 and the fourth sidewall 312 of the storage container 300. Each of the bottom injectors 326 may be disposed centrally through the bottom wall 334, which may be further defined by the central axis (X), as shown in FIG. 15. Advantageously, this will allow for an even dispersion of molten material 318 to be filled around the bottom wall 334 during the injection molding process 304.

Figure 19:
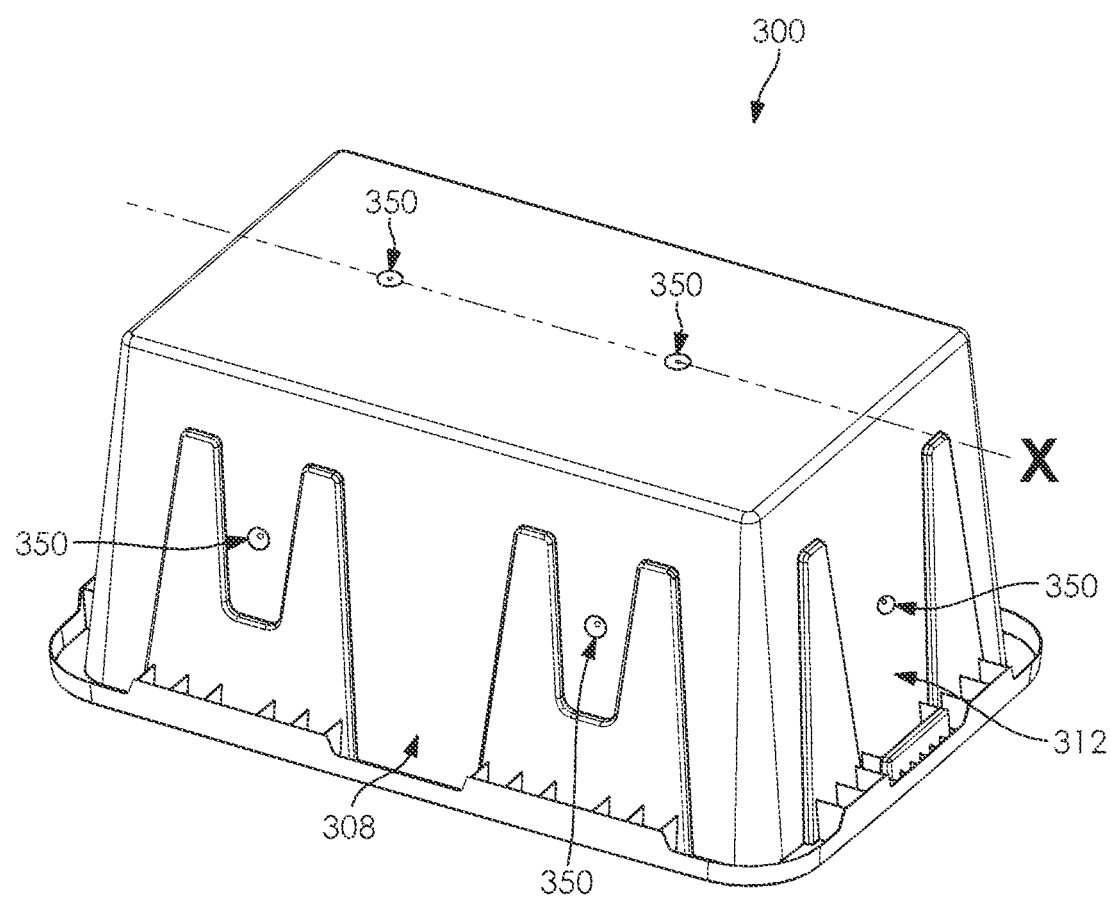
FIG. 19 is a bottom perspective view of the storage tote formed by the injection molding process, as shown in FIG. 15, depicting a plurality of sprue marks on the plurality of sidewalls and the bottom wall of the storage tote, according to another embodiment of the present technology.

With particular reference to FIG. 19, the body 302 formed by the injection molding process 304 may further include at least one sprue mark 350 on at least one of the plurality of sidewalls 306, 308, 310, 312 and on the bottom wall 334. The at least one sprue mark 350 is a physical indication of where the molten material 318 was injected at on the storage container 300 during the injection molding process 304. As a non-limiting example, the sprue mark 350 may be a circle with a nub located in a substantially central location on the circle.

Figure 20:
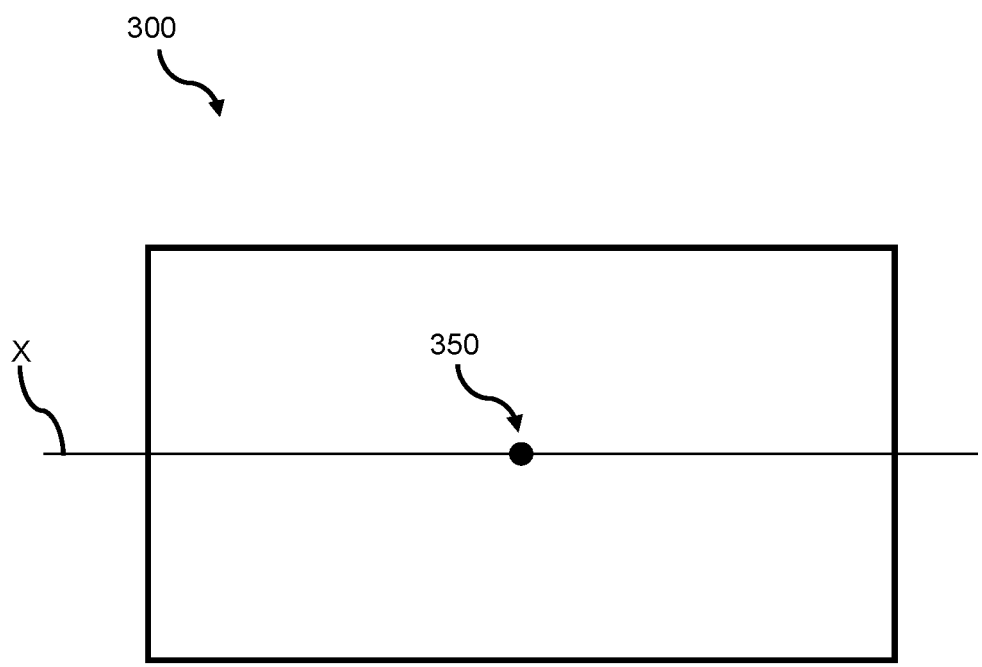
FIG. 20 is a schematic bottom plan view of a storage container, further depicting a single bottom injector disposed through the bottom wall of the storage container, according to another embodiment of the present disclosure.

As shown in FIG. 20 and in another embodiment, the storage container 300 may be formed using a plurality of side injectors 326 and one bottom injector 326. The one bottom injector 326 may be disposed centrally along the central axis (X) of the bottom wall 334, as shown by the sprue mark 350 on the bottom wall 334 in FIG. 20. The bottom injector 326 may be disposed relatively center to the bottom wall 334 and relatively center to each of the plurality of sidewalls 306, 308, 310, 312.

Figure 21:
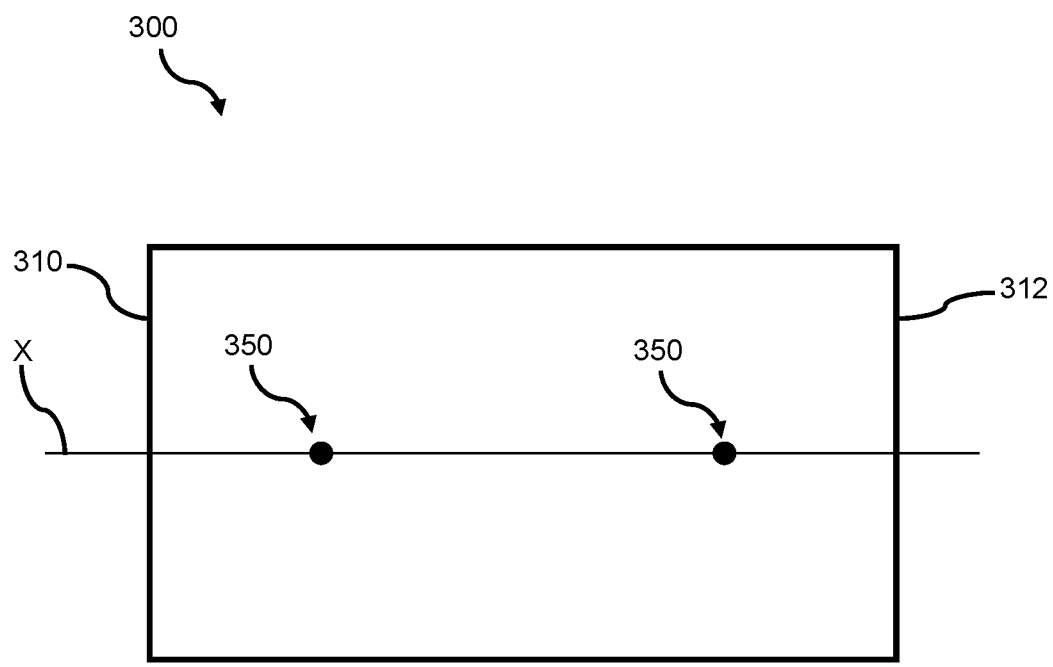
FIG. 21 is a schematic bottom plan view of a storage container, further depicting a pair of bottom injectors equally spaced apart from the respective ends of the storage container disposed through the bottom wall of the storage container, according to another embodiment of the present disclosure.

In yet another embodiment, as shown in FIG. 21, the storage container 300 may be manufactured by injecting molten material 318 through the plurality of sidewalls and through the bottom wall using two bottom injectors 326 disposed centrally through the bottom wall 334 along the central axis (X). More specifically, each of the bottom injectors 326, as shown by the sprue marks 350 in FIG. 21, may be disposed at an equal distance from each of the third sidewall 310 and the fourth sidewall 312, respectively.

Figure 22:
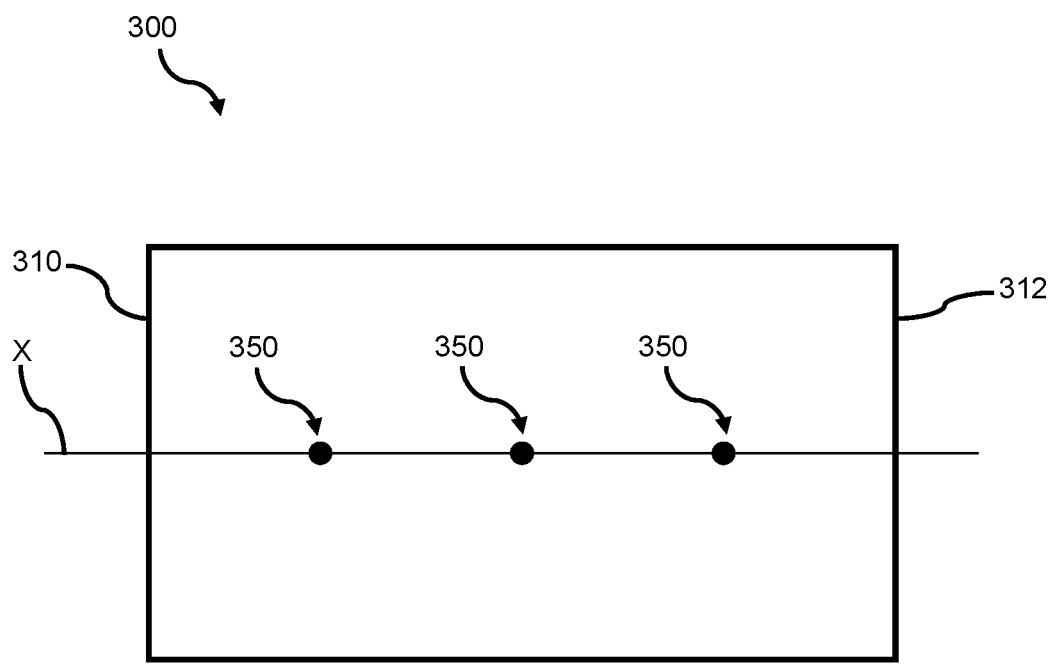
FIG. 22 is a schematic bottom plan view of a storage container, further depicting three bottom injectors equally spaced apart from one another along the central axis of the storage container, according to another embodiment of the present disclosure.

With reference to FIG. 22, and according to another embodiment, the storage container 300 may be manufactured using a plurality of side injectors 326 and three bottom injectors 326. Each of the three bottom injectors 326 may include a first bottom injector, a second bottom injector, and a third bottom injector, where each of the three bottom injectors 326 may be disposed centrally through the bottom wall 334. Each of the three bottom injectors 326 may be equally spaced apart from one another, as specifically shown in FIG. 22, and disposed along the central axis (X). Additionally, each of the three bottom injectors 326 may be equally spaced apart from the third sidewall 310 and the fourth sidewall 312 of the storage container 300. Each of the three bottom injectors 326 may also be equally spaced apart from each of the first sidewall 306 and the second sidewall 308, respectively. The first third bottom injector may be disposed adjacent the first bottom injector and the second bottom injector along the central axis (X).

Figure 23:
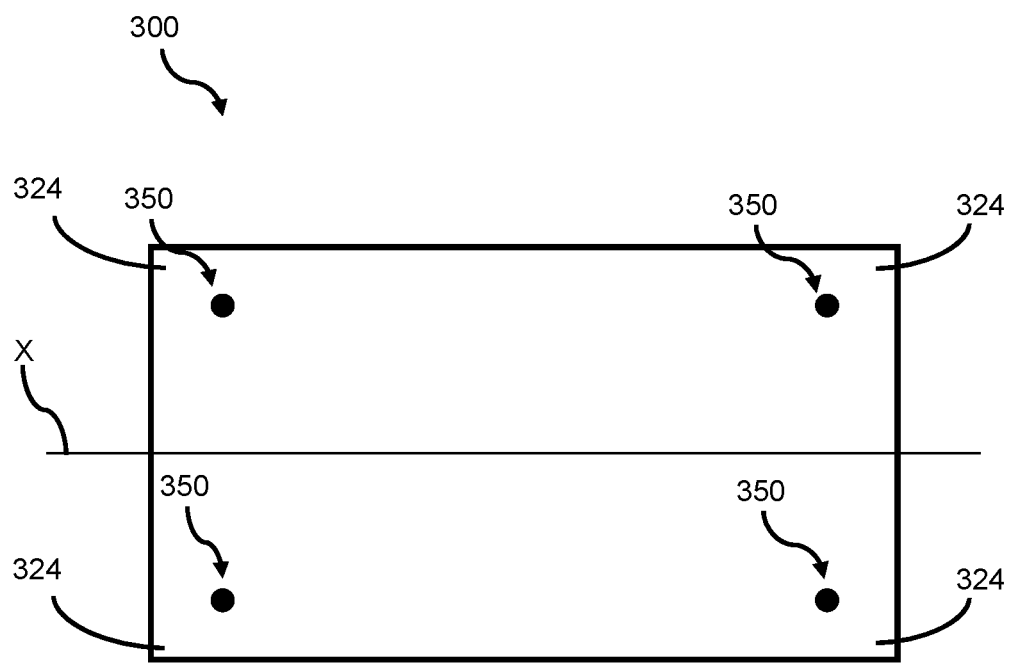
FIG. 23 is a schematic bottom plan view of a storage container, further depicting four bottom injectors disposed adjacent each of the corners of the bottom wall of the storage container, according to another embodiment of the present disclosure.

According to another embodiment, as shown in FIG. 23, the storage container 300 may be formed using a plurality of side injectors 326 as well as four bottom injectors 326 disposed through the bottom wall 334 of the mold 320. Each of the four injectors 326 may include a first bottom injector, a second bottom injector, a third bottom injector, and a fourth bottom injector, where each of the four bottom injectors 326 may be disposed adjacent the plurality of corners 324 of the storage container, as specifically shown by the sprue marks 350 in FIG. 23. Each of the four bottom injectors may be disposed through the bottom wall 334.

Figure 24:
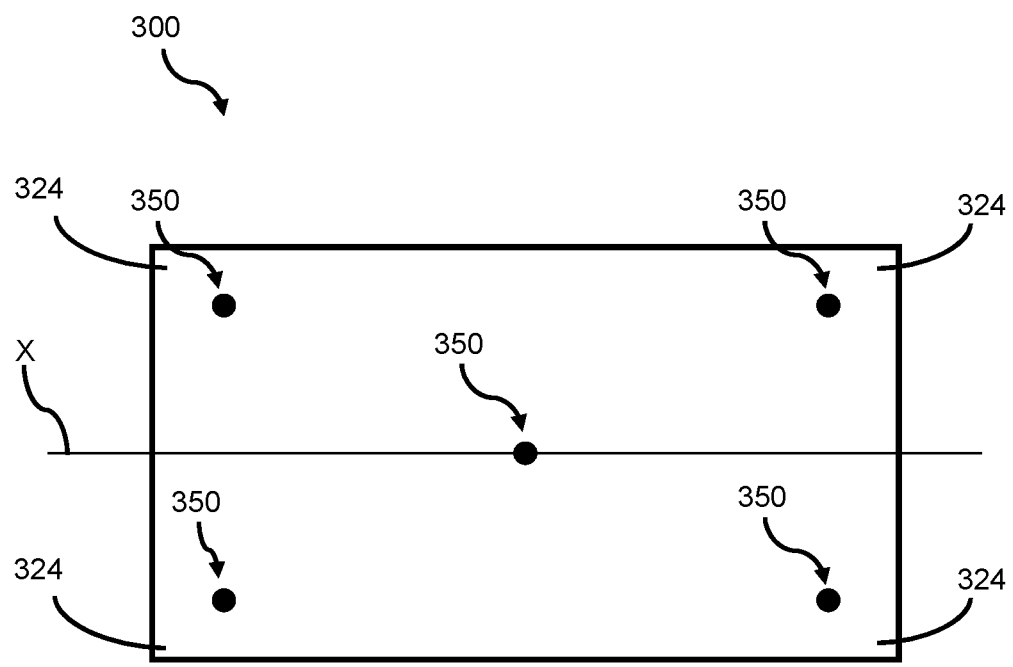
FIG. 24 is a schematic bottom plan view of a storage container, further depicting five bottom injectors disposed through the bottom wall of the storage container, as a combination of the bottom injectors shown in FIGS. 19 and 23, according to another embodiment of the present disclosure.

As shown in FIG. 24, and according to yet another embodiment, five bottom injectors 326 may be disposed through the bottom wall 334 to manufacture the storage container 300. It should be appreciated that the embodiment shown in FIG. 24 is a combination of the embodiments shown in FIGS. 19 and 23. Each of the five bottom injectors 326 may include a first bottom injector, a second bottom injector, a third bottom injector, a fourth bottom injector, and a fifth bottom injector. Each of the first bottom injector, the second bottom injector, the third bottom injector, and the fourth bottom injector may be equally spaced apart from the fifth bottom injector. The fifth bottom injector may be centrally disposed along the central axis (X), as shown in FIG. 24. One of ordinary skill in the art may select a suitable number of bottom injectors 326 to dispose through the bottom wall 334 in addition to disposing a plurality of side injectors 326 through at least one of the plurality of side surfaces 336 of the storage container 300 to manufacture the storage container 300 within the scope of the present disclosure.

With continued reference to FIGS. 19-26, the storage container 300 may be manufactured by the combination of a plurality of side injectors 326 and at least one bottom injector 326. It should be appreciated that the storage container 300 may be manufactured by simultaneously injecting the molten material 318 through each of the at least one bottom injector 326 and each of the plurality of side injectors 326 to provide a faster fill time of the storage container 300. In another embodiment, the storage container 300 may also be manufactured by sequentially filling the mold 320. More particularly, the mold 320 need not be simultaneously filled with molten material 318 during manufacturing. Rather, the at least one bottom injectors 326 may be injected with molten material 318 first and the plurality of side injectors 326 may be injected with molten material 318 second. In another embodiment, the plurality of side injectors 326 may be injected with molten material 318 first and the at least one bottom injector 326 may be filled with molten material 318 second. One of ordinary skill in the art may select a suitable configuration to simultaneously fill the plurality of injectors 326 or sequence the filling of the plurality of injectors 326 within the scope of the present disclosure.

Figure 25:
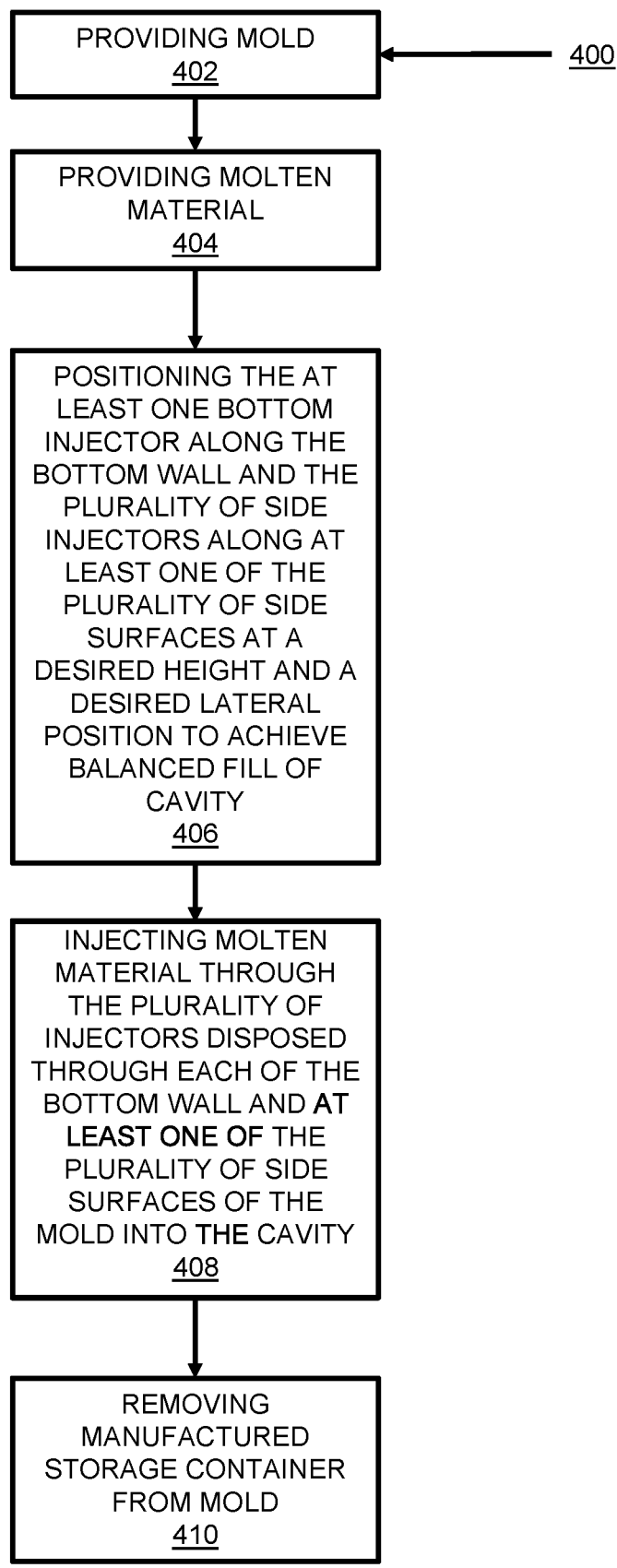
FIG. 25 is a flowchart of a method for manufacturing the storage tote formed by the injection molding process, according to another embodiment of the present technology.

In a particular embodiment, as shown in FIG. 25, the storage container 300 formed by the injection molding process 304 may include a method 400 for manufacturing the storage container 300. The method 400 may have a step 402 of providing a mold 320 having a top wall 332, a bottom wall 334, a plurality of side surfaces 336, and at least two separable sections 338, 340. The at least two separable sections 338, 340 may be selectively disposed in at least one of an open position (not shown) and a closed position 342. The first section 338 may be configured to selectively receive the second section 340, in operation. Where the mold 320 is in the closed position 342, a cavity 344 may be formed between the first section 338 and the second section 340. The mold 320 may further include a plurality of injectors 326 directed into the cavity 344 when the mold 320 is in the closed position 342. The plurality of injectors 326 may further include at least one bottom injector 326 disposed through the bottom wall 334 and a plurality of side injectors 326 disposed through at least one of the plurality of side surfaces 336. The plurality of side injectors 326 may further include a first pair of side injectors 326 disposed through the first side surface and a second pair of side injectors disposed through the second side surface. The method 400 may include another step 404 of providing a molten material 318. Next, the method 400 may have a step 406 of positioning the at least one bottom injector 326 along the bottom wall 334 and the plurality of side injectors 326 along at least one of the plurality of side surfaces 336 at a desired height and a desired lateral position to achieve a balanced fill of the cavity 344. The balanced fill of the cavity may be achieved where a top end 346 of the cavity 344 and a bottom end 348 of the cavity 344 may be completely injected with molten material 318 substantially simultaneously. The method 400 may include a step 408 of injecting the molten material 118 through the plurality of injectors 326 disposed through each of the bottom wall 334 and the at least one of the plurality of side surfaces 336 of the mold 320 into the cavity 344. Afterwards, the method 400 may include a step 410 of removing the storage container 300 manufactured with the injection molding process 304 from the mold 320.

In a further embodiment, the method 400 may include a step 412 of sequentially injecting the molten material 318 through the at least one bottom injector 326 disposed through the bottom wall 334 and injecting the molten material 318 through the at least one of the plurality of side injectors 326 disposed through the at least one of the plurality of side surfaces 336 of the mold 320 into the cavity 344. In another embodiment, the step may include sequentially injecting the molten material 318 through the plurality of side injectors 326 disposed through at least one of the plurality of side surfaces 336 and injecting the molten material 318 through the at least one bottom injector 326 disposed through the bottom wall 334 of the mold 320 into the cavity 344. One of ordinary skill in the art may select a suitable configuration to sequence the filling of the mold 320 to enhance the features, as described herein, of the storage container 300 during manufacturing, within the scope of the present disclosure.

Figure 26:
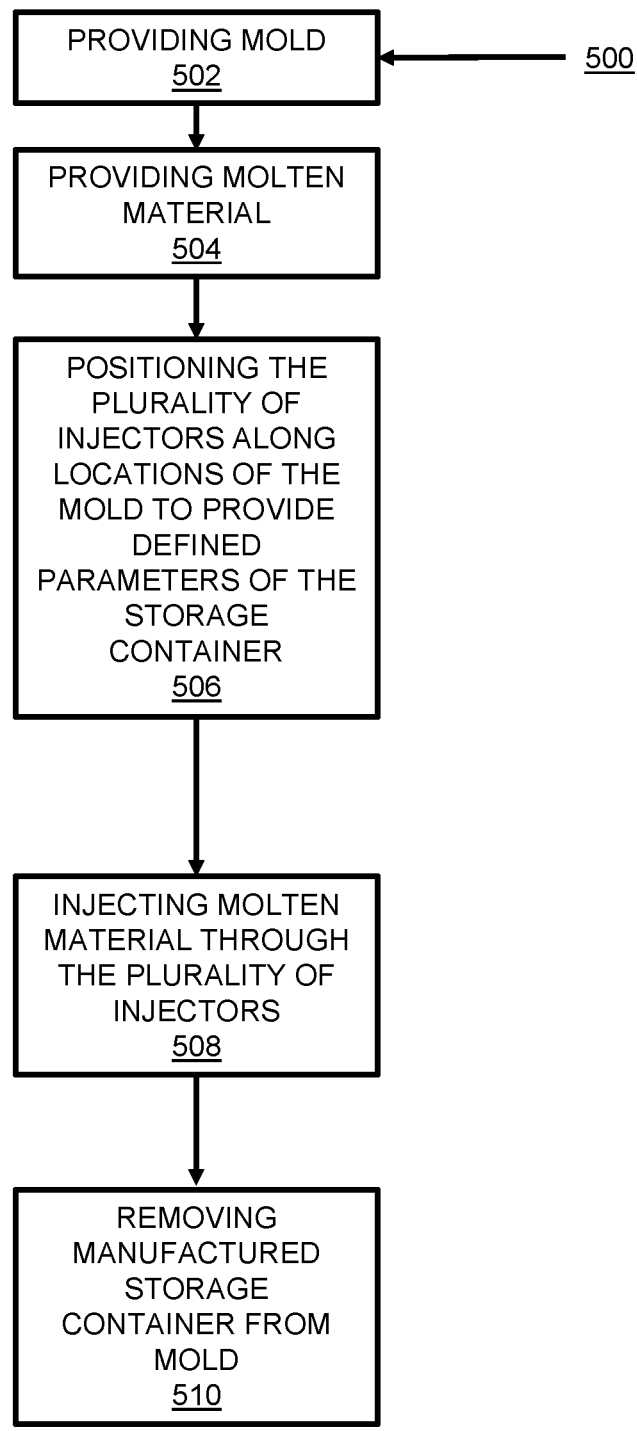
FIG. 26 is a flowchart of yet another method for manufacturing the storage tote formed by injection molding process, according to another embodiment of the present disclosure.

In another embodiment, as shown in FIG. 26, the storage container 100, 300 formed by the injection molding process 304 may include a method 500 for manufacturing the storage container 100, 300. The method 500 may include a step 502 of providing a mold 120, 320 having a top wall 132, 332, a bottom wall 134, 334, a plurality of side surfaces 136, 336, and at least two separable sections 138, 140, 338, 340. The at least two separable sections 138, 140, 338, 340 may be selectively disposed in at least one of an open position (not shown) and a closed position 142, 342. The first section 138, 338 may be configured to selectively receive the second section 140, 340, in operation. Where the mold 120, 320 is in the closed position 142, 342, a cavity 144, 344 may be formed between the first section 138, 338 and the second section 140, 340. The mold 120, 320 may further include a plurality of injectors 126 326 directed into the cavity 144, 344 when the mold 120, 320 is in the closed position 142, 342. The method 500 may include another step 504 of providing a molten material 118, 318. Next, the method 500 may have a step 506 of positioning the plurality of injectors 126, 326 along locations of the mold 120, 320 to provide defined parameters of the storage container 100, 300. The defined parameters of the storage container may include providing a balanced fill of the cavity 344, a faster fill time of the cavity 344, a lower clamp force pressure, a faster total production time, a lower deflection point along a baseline point of the storage container 100, 300, and a lower weight of the storage container 100, 300. The balanced fill of the cavity may be achieved where a top end 146, 346 of the cavity 144, 344 and a bottom end 148, 348 of the cavity 144, 344 may be completely injected with molten material 118, 318 substantially simultaneously. The method 500 may include a step 508 of injecting the molten material 118, 318 through the plurality of injectors 126, 326. Afterwards, the method 500 may include a step 510 of removing the storage container 100, 300 manufactured with the injection molding process 104, 304 from the mold 120, 320.

Without being limited to any particular theory, it is believed that due to the nature and positioning of the plurality of injectors through both the bottom wall 334 and the plurality of sidewalls 306, 308, 310, 312, the molten material 318 will be able to flow and fill the gaps in the cavity 344 at a much faster fill time. Effectively, this results in a balanced control of the molten material 318 as it is dispersed through the mold 320. One of ordinary skill in the art may select specific locations to minimize the amount of travel of the molten material 318 as it is dispersed through the mold 320. One of ordinary skill in the art may also sequence the opening of the gates in such a way so as to minimize the length of travel of the molten material 318 and maximize the speed which the mold 320 is filled thereby making a more durable and higher quality storage container 300 with less warpage and cracking.

EXAMPLES

With reference to FIGS. 15-24, according to another embodiment of the present disclosure, the storage container 300 will include the following aspects when one of ordinary skill in the art manufactures the storage container 300 according to the method 400, 500 of the present disclosure. The addition of at least one injector 326 disposed along the bottom wall 334 will allow the molten material 318 to be dispersed evenly and will further provide for faster fill times than normal methods. Advantageously, the resulting storage container 300 will have a lighter weight and improved part quality, deflection, and strength where compared to its conventional storage tote 122, where the molten material 318 is injected only at the base wall 123.

Additionally, positioning the plurality of injectors 326 through each of the bottom wall 334 and the plurality of sidewalls 306, 308, 310, 312, will provide a balanced fill of the mold due to the simultaneous injection of molten material 118. The resulting storage container 300 will further be more durable compared to the similar storage tote 122 formed by other injection molding processes because of the balanced fill of molten material 118 during manufacturing of the storage container 300.

With renewed reference to FIGS. 15-19, the storage container 300 will have a weight that is about 15% less than a weight of the storage tote 122 formed by an injection molding process 304 which includes injecting the molten material 118 through only the base wall 123 of the storage tote 122. The storage container 300 will also have a bottom surface 316 with a tolerance of deflection L2 that is significantly less than the tolerance of deflection L1 associated with the prior art storage tote 122 formed by injection molding processes which includes injecting the molten material 118 at only the base wall 123 of the storage tote 122. The addition of at least one injector 326 disposed through each of the bottom wall 334 and the plurality of sidewalls 306, 308, 310, 312, will provide a tolerance of deflection L2 between thirty-three percent (33%) and fifty percent (50%) less than the tolerance of deflection L1 for prior art storage totes 122 of similar overall size and dimensions. Finally, the storage container 300 will also be more durable compared the storage tote 122 formed by known injection molding processes.

More specifically, the bottom surface 316 of the storage container 300 of the present disclosure has a tolerance of deflection L2 that is significantly less than the tolerance of deflection L1 associated with the prior art storage tote 122 formed by the injection molding process which includes injecting the molten material 118 at the base wall 123 of the storage tote 122. In particular examples, it will be found that the tolerance of deflection L2 for storage containers 100 formed by the side shot injection molding process 104 is between thirty-three percent (33%) and fifty percent (50%) less than the tolerance of deflection L1 for prior art storage totes 122 of similar overall size and dimensions. This important reduction in the tolerance of deflection of the bottom surface 316 of the storage container 300 of the present disclosure is realized in minimal warping and improved durability of the storage container 300.

In particular, the tolerance of deflection L2 for the bottom surface 316 of the storage container 300 will be less than 0.15 inches. In a more specific example, the tolerance of deflection L2 will be between 0.07 inches and 0.11 inches. In an even more specific example, the tolerance of deflection L2 will be between 0.09 inches and 0.1 inches. In a most specific example, the tolerance of deflection L2 will be about 0.094 inches. It will be found that the tolerance of deflection L2 in these ranges will result in a significant improvement in reducing warping and enhanced durability of the storage container 300, in operation, relative to the prior art storage totes 122 as described and shown in FIGS. 1, and 9-10. Other suitable deflection tolerances may also be accepted by the skilled artisan, for example, based on the overall size and dimensions of the storage container 300 being manufactured, within the scope of the present disclosure.

In a certain example, the storage container 300 formed by the injection molding process 304 of the present disclosure will be more durable compared to a similar storage tote 122 formed by known injection molding processes. In a more specific example, the durability of the storage container 300 will be tested in a variety of manners such as a drop test and an impact resistance test. The drop test will award a pass rating when the storage container 300 incurs no damage after dropping the storage container 300 three times from a height of thirty-six inches to a vinyl covered concrete slab (not shown). The impact resistance test only awards a pass rating where the storage container 300 incurs no cracking, chipping, or separation of material where the storage container 300 may be placed lying on the first sidewall 306 and a three ounce (+/−2%) steel ball may be dropped onto the second sidewall 308 of the storage container 300 from a height of 36 inches. Storage totes, such as storage tote 122, formed by known injection molding processes typically do not pass at least one of the drop test and the impact resistance test. Advantageously, the storage container 300 formed by the injection molding process 304 of the present disclosure will pass each of the drop test and the impact resistance test. A skilled artisan may select other durability tests to identify the superior strength of the storage container 300 formed by the injection molding process 304, within the scope of the present disclosure.

In one example, the injection molding process 304 will have faster total production time than known methods. The total production time is the time required to form the storage container 300. In a more specific example, the total production time of the injection molding process 304 will be about 55% less than a total production time of the storage tote 122 formed by the injection molding process which includes injecting the molten material 118 only at the base wall 123 of the storage tote 122.

Figure 18:
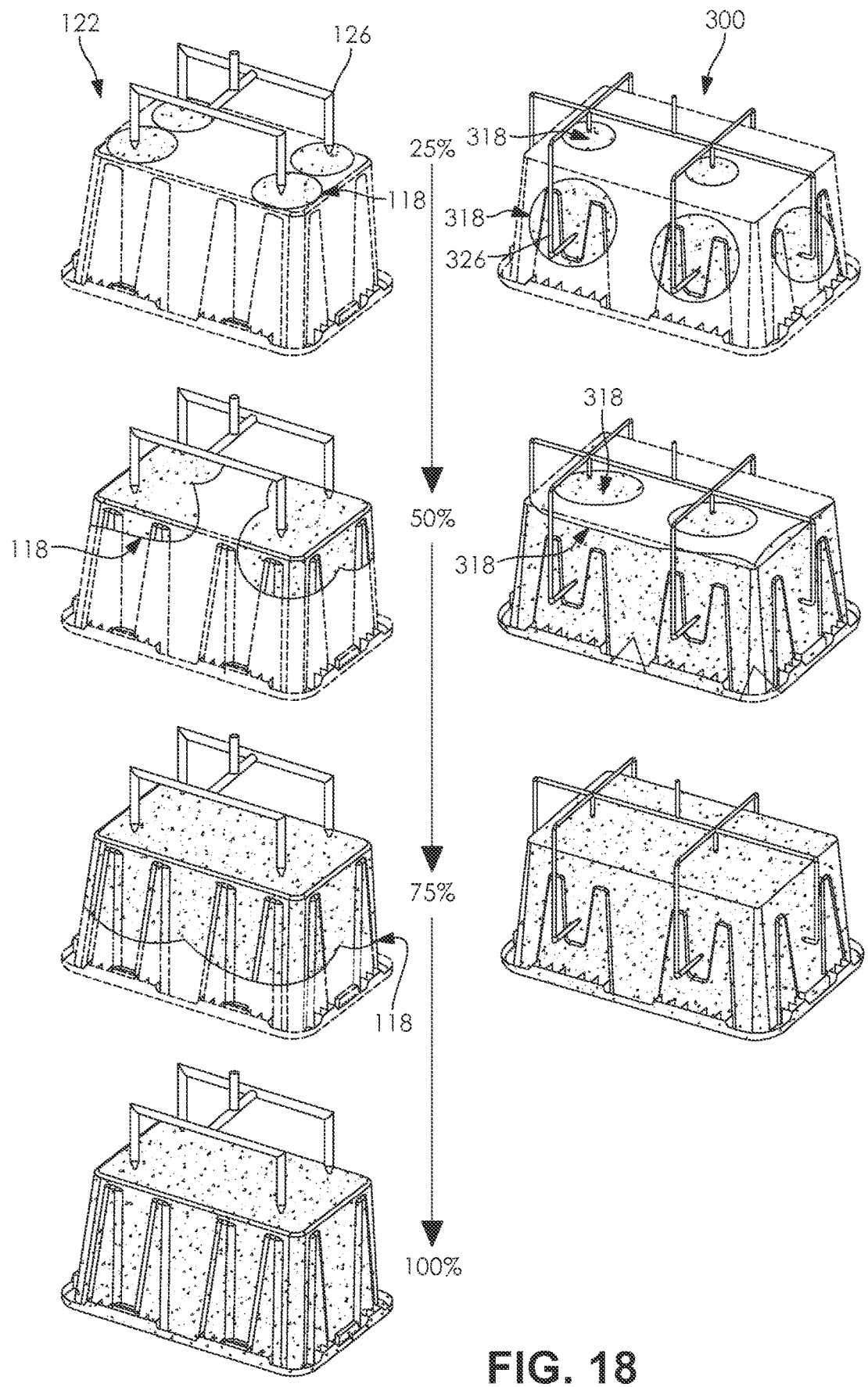
FIG. 18 is a series of top perspective views of each of a storage tote formed by conventional methods, as shown in FIG. 1, and the storage tote formed by the injection molding process, as shown in FIG. 15, further depicting the storage tote formed by the injection molding process filling at a faster rate than the storage tote formed by conventional methods.

In another example, as shown in FIG. 18, the storage container 300 formed by the injection molding process 304 will have a faster fill time than known methods. Fill time is the time required to fill the cavity 344 to form the storage container 300. In a more specific example, the fill time of the injection molding process 304 will be between eleven percent (11%) and forty-five percent (45%) faster than the fill time of a similar storage tote 122 formed by the injection molding process which includes injecting the molten material 118 at the bottom surface of the storage tote 122. Additionally, in a more specific example, the injection molding process 304 will have a fill time of the injection molding process 304 which will be between 2.5 seconds and 4.0 seconds. With continued reference to FIG. 18, as a non-limiting example, it should be acknowledged that the storage container 300 will be completely formed by the time indicator "75%," whereas the storage tote 122 formed by injecting the molten material 118 at the bottom surface of the storage tote 122 is not completely formed until the time indicator "100%." Advantageously, the faster fill time of the storage container 100 formed by the injection molding process 304 will allow for a lower temperature molten material 318 to be required to form the storage container 300. Desirably, the lower temperature molten material 318 will completely form the storage container 300 without prematurely solidifying in the cavity 344 due to the faster fill time of the injection molding process 304.

In a separate example, the injection molding process 304 will include injecting the molten material 318 at a temperature between 350° F. and 550° F. The temperature of the molten material 118 in the prior art storage tote 122 formed by the injection molding process, which includes injecting the molten material 118 at the base wall 123 of the storage tote 122, typically requires a temperature above 550° F. Advantageously, the injection molding process 304 will require a lower temperature of the molten material 318 which will reduce a molten material 318 heating time, a molten material 318 cooling time, and any energy required for additional heating of the molten material 318. A skilled artisan may select other suitable temperature ranges to form the storage container 300, within the scope of the present disclosure.

In a particular instance, the injection molding process will require a lower clamp force pressure than known methods. The clamp force pressure is the pressure required to hold the mold 320 in the closed position 342 to form the storage container 300 during the injection molding process 304. In a more particular instance, the clamp force pressure will be about 25% less than a clamp force required to form the prior art storage tote 122 by the injection molding process which includes injecting the molten material 118 at the base wall 123 of the storage tote 122.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method for manufacturing a storage container with an injection molding process, the method comprising steps of:
    providing a mold having a top wall, a bottom wall, and a plurality of side surfaces, the plurality of side surfaces includes a first side surface, a second side surface, a third side surface, and a fourth side surface, the mold includes two sections, wherein when the mold is in a closed position, a cavity is formed between the two sections, the mold further includes a plurality of injectors directed into the cavity when the mold is in the closed position, the plurality of injectors including at least one bottom injector disposed through the bottom wall and a plurality of side injectors disposed through at least one of the plurality of side surfaces, the plurality of side injectors including a first pair of side injectors disposed through the first side surface and a second pair of side injectors disposed through the second side surface;
    providing a molten material;
    positioning the at least one bottom injector along the bottom wall and the plurality of side injectors along at least one of the plurality of side surfaces at a desired height and a desired lateral position to achieve a balanced fill of the cavity;
    injecting the molten material through the plurality of injectors disposed through each of the bottom wall and the at least one of the plurality of side surfaces of the mold into the cavity; and
    removing the storage container manufactured with the injection molding process from the mold.

2. The method of claim 1, wherein the injection molding process has a total production time which is the time required to form the storage container, where the total production time of the storage container is about 55% less than a total production time of the storage container formed by the injection molding process but where the molten material is injected only at the bottom surface of the storage container.

3. The method of claim 1, wherein the injection molding process has a fill time which is the time required to fill the cavity to form the storage container, wherein the fill time is between 2.5 seconds and 4.0 seconds.

4. The method of claim 1, wherein the injection molding process includes injecting the molten material at a temperature between 350° F. and 550° F.

5. The method of claim 1, wherein the injection molding process has a clamp force pressure which is the pressure required to hold a mold in a closed position to form the storage container during the injection molding process, where the clamp force pressure is about 25% less than a clamp force required to form the storage container by the injection molding process but where the molten material is injected only at a bottom surface of the storage container.

6. The method of claim 1, wherein the injection molding process includes injecting the molten material through each of the bottom wall, the first side surface, the second side surface, the third side surface, and the fourth side surface.

7. The method of claim 1, further including a central axis bisecting the bottom wall.

8. The method of claim 7, wherein the at least one bottom injector is centrally disposed along the central axis of the bottom wall.

9. The method of claim 7, wherein the at least one bottom injector further includes a first bottom injector and a second bottom injector.

10. The method of claim 9, wherein the first bottom injector is disposed adjacent the second bottom injector, each of the first bottom injector and the second bottom injector are centrally disposed along the central axis of the bottom wall.

11. The method of claim 9, wherein the at least one bottom injector further includes a third bottom injector disposed adjacent the first bottom injector and the second bottom injector, each of the first bottom injector, the second bottom injector, and the third bottom injector are disposed along the central axis of the bottom wall.

12. The method of claim 11, wherein each of the first bottom injector, the second bottom injector, and the third bottom injector are equally spaced apart from one another along the central axis of the bottom wall.

13. The method of claim 11, wherein the at least one bottom injector further includes a fourth bottom injector, each of the first bottom injector, the second bottom injector, the third bottom injector, and the fourth bottom injector are disposed through the bottom wall.

14. The method of claim 13, wherein the at least one bottom injector further includes a fifth bottom injector, each of the first bottom injector, the second bottom injector, the third bottom injector, and the fourth bottom injector are disposed through the bottom wall, and the fifth bottom injector is centrally disposed along the central axis and equally spaced apart from each of the first bottom injector, the second bottom injector, the third bottom injector, and the fourth bottom injector.

15. The method of claim 1, wherein the plurality of side injectors includes at least one side injector disposed through each of the third side surface and the fourth side surface.

16. The method of claim 1, wherein the step of injecting the molten material further includes simultaneously injecting the molten material through each of the at least one bottom injector disposed through the bottom wall and the at least one of the plurality of side injectors disposed through the at least one of the plurality of side surfaces of the mold into the cavity.

17. The method of claim 1, wherein the step of injecting the molten material further includes sequentially injecting the molten material through the at least one bottom injector disposed through the bottom wall and injecting the molten material through the at least one of the plurality of side injectors disposed through the at least one of the plurality of side surfaces of the mold into the cavity.

18. The method of claim 1, wherein the step of injecting the molten material further includes sequentially injecting the molten material through the plurality of side injectors disposed through at least one of the plurality of side surfaces and injecting the molten material through the at least one bottom injector disposed through the bottom wall of the mold into the cavity.

19. A method for manufacturing a storage container with an injection molding process, the method comprising steps of:
providing a mold having a top wall, a bottom wall, and a plurality of side surfaces, the plurality of side surfaces includes a first side surface, a second side surface, a third side surface, and a fourth side surface, the mold includes two sections, wherein when the mold is in a closed position, a cavity is formed between the two sections, the mold further includes a plurality of injectors directed into the cavity when the mold is in the closed position;
providing a molten material;
positioning the plurality of injectors along locations of the mold to provide defined parameters of the storage container, the defined parameters of the storage container include providing a balanced fill of the cavity, a faster fill time of the cavity, a lower clamp force pressure, a faster total production time, a lower deflection point along a baseline point of the storage container, and a lower weight of the storage container;
injecting the molten material through the plurality of injectors; and
removing the storage container manufactured with the injection molding process from the mold,
wherein the injection molding process has a total production time which is the time required to form the storage container, where the total production time of the storage container is about 55% less than a total production time of the storage container formed by the injection molding process but where the molten material is injected only at the bottom surface of the storage container,
wherein the injection molding process has a fill time which is the time required to fill the cavity to form the storage container, wherein the fill time is between 2.5 seconds and 4.0 seconds, and
wherein the injection molding process has a clamp force pressure which is the pressure required to hold a mold in a closed position to form the storage container during the injection molding process, where the clamp force pressure is about 25% less than a clamp force required to form the storage container by the injection molding process but where the molten material is injected only at a bottom surface of the storage container.

* * * * *